(12) United States Patent
Tatsumi et al.

(10) Patent No.: US 11,065,705 B2
(45) Date of Patent: Jul. 20, 2021

(54) FILLET WELDING METHOD AND FILLET WELDED JOINT

(71) Applicant: NIPPON STEEL & SUMITOMO METAL CORPORATION, Tokyo (JP)

(72) Inventors: Yujiro Tatsumi, Tokyo (JP); Yasunobu Miyazaki, Tokyo (JP); Shinji Kodama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 724 days.

(21) Appl. No.: 15/759,625

(22) PCT Filed: Sep. 14, 2016

(86) PCT No.: PCT/JP2016/077178
§ 371 (c)(1),
(2) Date: Mar. 13, 2018

(87) PCT Pub. No.: WO2017/047665
PCT Pub. Date: Mar. 23, 2017

(65) Prior Publication Data
US 2018/0257160 A1    Sep. 13, 2018

(30) Foreign Application Priority Data

Sep. 14, 2015 (JP) ................................. 2015-180515
Sep. 14, 2015 (JP) ................................. 2015-180524
Sep. 14, 2015 (JP) ............................. JP2015-180579

(51) Int. Cl.
*B23K 9/025* (2006.01)
*B23K 9/23* (2006.01)
*F16B 5/08* (2006.01)

(52) U.S. Cl.
CPC ............... *B23K 9/025* (2013.01); *B23K 9/23* (2013.01); *B23K 9/232* (2013.01); *F16B 5/08* (2013.01)

(58) Field of Classification Search
CPC .......... B23K 9/025; B23K 9/23; B23K 9/232; B23K 11/063; B23K 11/0876;
(Continued)

(56) References Cited

U.S. PATENT DOCUMENTS 2,274,631 A * 2/1942 Russell .................... B23K 9/23
219/75
2,527,479 A * 10/1950 Hall ...................... B23K 11/115
219/91.2
(Continued)

FOREIGN PATENT DOCUMENTS

JP      61-38036 A      2/1986
JP   2005-103622 A      4/2005
(Continued)

OTHER PUBLICATIONS

European Office Action, dated May 8, 2019, for corresponding European Application No. 16846536.7.
(Continued)

*Primary Examiner* — Josh Skroupa
(74) *Attorney, Agent, or Firm* — Birch, Stewart, Kolasch & Birch, LLP

(57) ABSTRACT

A welding method for obtaining a lap fillet welded joint excellent in tensile strength, without causing an increase in welding deformation, not fracturing at the weld metal when a tensile load is applied, that is, a method of overlaying at least scheduled welding locations of a first steel sheet with a tensile strength of 780 MPa or more and a second steel sheet and fillet welding an end part of the first steel sheet and a surface of the second steel sheet, characterized by provid-
(Continued)

ing a reinforcing part at a surface of the first steel sheet at the opposite side to the surface to be overlaid with the second steel sheet and fillet welding one end part of the reinforcing material and the surface of the first steel sheet and by fillet welding the end part of the reinforcing part, the end part of the first steel sheet, and the surface of the second steel sheet so as to be covered by the weld metal.

20 Claims, 10 Drawing Sheets

(58) Field of Classification Search
CPC ..... B23K 20/1265; B23K 26/244; F16B 5/08; Y10T 403/477; Y10T 403/478; Y10T 403/479
USPC .......................................... 403/270, 271, 272
See application file for complete search history.

(56) References Cited

U.S. PATENT DOCUMENTS

| | | | | |
|---|---|---|---|---|
| 2,914,846 | A * | 12/1959 | Baldus | B23K 9/007 228/185 |
| 2,963,129 | A * | 12/1960 | Eberle | B23K 9/232 428/614 |
| 3,464,802 | A * | 9/1969 | Meyer | B23K 9/23 428/594 |
| 3,628,924 | A * | 12/1971 | Nishio | B23K 9/23 428/602 |
| 4,068,964 | A * | 1/1978 | Stoker | E04B 1/2403 228/182 |
| 4,459,062 | A * | 7/1984 | Siebert | B23K 9/23 219/76.16 |
| 5,305,946 | A * | 4/1994 | Heilmann | B23K 31/02 220/586 |
| 5,383,592 | A * | 1/1995 | Fussnegger | B23K 33/004 228/135 |
| 6,359,260 | B1 | 3/2002 | Peel et al. | |
| 6,479,168 | B2 * | 11/2002 | Mazumder | B23K 26/244 428/659 |
| 9,339,887 | B2 * | 5/2016 | Kinefuchi | B23K 9/025 |
| 9,943,922 | B2 * | 4/2018 | Ishida | B23K 9/025 |
| 10,610,945 | B2 * | 4/2020 | Kawamoto | B23K 9/23 |
| 2010/0215963 | A1 * | 8/2010 | Matsuo | B29C 66/1142 428/411.1 |
| 2015/0071703 | A1 | 3/2015 | Ishida et al. | |
| 2016/0001403 | A1 * | 1/2016 | Matsumoto | B23K 9/232 219/137 R |

FOREIGN PATENT DOCUMENTS

| | | |
|---|---|---|
| JP | 2005-169450 A | 6/2005 |
| JP | 3813031 B2 | 8/2006 |
| JP | 2007-260707 A | 10/2007 |
| JP | 2013-139047 A | 7/2013 |
| JP | 5522317 B2 | 6/2014 |

OTHER PUBLICATIONS

Indian Office Action for corresponding Indian Application No. 201817009133, dated Nov. 18, 2019, with an English translation.
Brazilian Office Action, dated Oct. 15, 2019, for corresponding Brazilian Application No. BR112018003942-0, with an English translation.
International Search Report for PCT/JP2016/077178 dated Oct. 25, 2016.
Written Opinion of the International Searching Authority for PCT/JP2016/077178 (PCT/ISA/237) dated Oct. 25, 2016.

* cited by examiner (a)

(b)

(c)

FILLET WELDING METHOD AND FILLET WELDED JOINT

TECHNICAL FIELD

The present invention relates to a lap fillet welding method and a lap fillet welded joint of high strength steel sheet, more particularly relates to a lap fillet welding method of a part used as a component of an automobile and able to be welded from only one side and to a lap fillet welded joint obtained by the same.

BACKGROUND ART

In the field of automobiles, improvement of fuel efficiency for environmental conservation by lightening the weight of car bodies and improvement of collision safety are being sought. For this reason, various attempts have been made up to now to use high strength steel sheet to reduce thicknesses and to optimize car body structures to lighten the weight of car bodies and improve collision safety.

On the other hand, in welding parts of automobiles etc., spot welding is mainly being performed, but at portions such as the undercarriage or chassis where strength and rigidity are required, linear welding becomes necessary and fillet welding is performed. Further, in a welded joint of such a portion, provision of sufficient fatigue strength and static tensile strength are demanded.

Usually, the fatigue strength of the base materials used for the members to be welded increases proportionally to the base material strength, but it is known that the fatigue strength of a welded joint will not necessarily increase even if the base material strength increases. This is one factor obstructing the reduction of weight of car bodies by using high strength steel sheets.

For this reason, in welded joints obtained by fillet welding high strength steel sheets, improvement of the fatigue strength has mainly been studied. Improvement of the tensile strength has not been studied that much.

PLT 1 discloses the art of suitably setting the hardness and components of the weld metal and the dimensions of the fillet weld bead so as to improve the tensile strength of the welded joint obtained by fillet welding.

PLT 2 discloses the art of superposing weld beads at a T-welded joint to make the thickness of the weld metal increase and improve the joint strength.

PLT 3 discloses the art of forming a stiffening bead separate from a weld bead in a lap fillet welded joint as one art of improving the fatigue strength.

CITATION LIST

Patent Literature

PLT 1: Japanese Patent Publication No. 2005-103622A
PLT 2: Japanese Patent Publication No. 2013-139047A
PLT 3: Japanese Patent No. 5522317B2

SUMMARY OF INVENTION

Technical Problem

One example of a test piece, in a state after a tensile test is shown in FIG. 1, obtained by overlaying high strength steel sheets and fillet welding them.

FIG. 1 is a photograph of the cross-section in the sheet thickness direction, in the state after a tensile test, of a test piece obtained by overlaying tensile strength 1180 MPa class, thickness 1.6 mm steel sheets 1a, 1b and fillet welding the end part of the steel sheet 1a and the surface of the steel sheet 1b. Note that the steel sheet 1a side will sometimes be referred to as the "upper side", while the steel sheet 1b side will sometimes be referred to as the "lower side".

The test piece shown in FIG. 1 did not fracture at the steel sheets (base materials) 1a, 1b. When applying a 28 kN load, a crack grew from the root part of the weld bead (fillet weld zone) 2 in a direction substantially vertical to the tensile direction leading to fracture at the weld metal.

FIG. 2 shows the distribution of Vickers hardness. FIG. 2 measures the Vickers hardness at a position of 0.2 mm depth from the surface of the steel sheet (base material) 1b, where the weld bead 2 is formed at the surface shown in FIG. 1, in the thickness direction (position shown by dotted line) in a direction parallel to the surface of the steel sheet (base material) 1b. In FIG. 2, the region A is the Vickers hardness of the base material part and weld heat affected zone (HAZ), while the region B is the Vickers hardness of the weld metal. In this way, the Vickers hardness of the weld metal becomes equal to the Vickers hardness of the base materials.

In this way, the test piece prepared using a steel sheet having a tensile strength of 780 MPa or more (base material) at least for the upper side steel sheet does not fracture at the base material, but fractures at the weld metal due to growth of a crack from the root part where the stress concentrates since the upper side steel sheet is not high in ductility and, further, the Vickers hardness of the weld metal and the Vickers hardness of the base material become equal.

On the other hand, in a welded joint obtained by fillet welding, if the joint does not fracture at the weld metal, but stably fractures at the base materials when an excessive tensile load is applied, the design strength of the welded joint can be obtained with a good reproducibility, so it is possible to contribute to improvement of the safety and reliability of automobiles etc.

The art disclosed in PLT 1 improves the tensile strength by adjusting the hardness of the weld metal by its chemical composition, but if the Vickers hardness HV of the weld metal exceeds 500, sometimes delayed fracture of the weld metal occurs. Further, sometimes it is not possible to flexibly select the welding wire for adjustment of the chemical composition.

Further, referring to PLT 2, the inventors studied improving the tensile strength of a lap fillet welded joint by increasing the thickness of the weld metal. However, for welding so that the weld metal becomes thicker, it is necessary to increase the input heat. As a result, sometimes welding deformation increased.

Further, with the stiffening bead disclosed in PLT 3, just partial reinforcement is obtained. Further, if increasing the number of the stiffening beads, sometimes the amount of input heat increases and welding deformation increases.

On the other hand, in a lap fillet welded joint, it is possible to weld the two sides of the members to be welded by fillet welding so as to thereby raise the tensile strength. However, due to the structure of the members to be welded, sometimes it is only possible to weld from one side of the members to be welded. Sometimes it is not possible to weld the two sides of the members to be welded by fillet welding.

In the present invention, in consideration of such a situation, the object is to provide a welding method for obtaining a lap fillet welded joint excellent in tensile strength which does not cause an increase in welding deformation and which does not fracture at the weld metal when a tensile load is applied.

Solution to Problem

The inventors engaged in in-depth studies on means for solving this problem. The inventors came up with the idea of overlaying a tensile strength 780 MPa or more first steel sheet (below, also referred to as a "high strength steel sheet") forming the upper side steel sheet in a fillet welded joint and a second steel sheet forming the lower side steel sheet and fillet welding the end part of the first steel sheet and the surface of second steel sheet during which providing a reinforcing part at the surface of the first steel sheet at the opposite side to the surface overlaid with the second steel sheet to disperse the strain concentrating at the root part.

Further, when fillet welding so that the weld metal covers the end part of the reinforcing part, the end part of the first steel sheet, and the surface of the second steel sheet, they discovered that the tensile strength is improved without increasing the welding deformation of the welded joint.

The present invention was made based on such a discovery and has as its gist the following:

(1) A method of fillet welding comprising overlaying scheduled welding locations of a first steel sheet and a second steel sheet, the first steel sheet having a tensile strength of 780 MPa or more, the method comprising the steps of: forming a reinforcing part joined to a surface of the first steel sheet at the opposite side to a surface of the first steel sheet contacting the second steel sheet when overlaying the first steel sheet and the second steel sheet; and fillet welding so that a weld metal covers an end part of the reinforcing part and a space between an end part of the first steel sheet and the surface of the second steel sheet.

(2) The method of (1) wherein $(D_T \times H_F)/(D_1 \times H_S)$ is 1.50 or more wherein $D_T$ (mm) is a throat thickness of a fillet weld zone formed by the fillet welding, $H_F$ (HV) is an average hardness of the fillet weld zone, $D_1$ (mm) is a thickness of the first steel sheet, and $H_S$ (HV) is a smaller hardness of a hardness of a HAZ softened part of the fillet weld zone of the first steel sheet and the hardness of the base material of the first steel sheet.

(3) The method of (1) or (2) wherein the reinforcing part is a reinforcing material.

(4) The method of (3) wherein an end part of the reinforcing material is fillet welded to a surface of the first steel sheet at the opposite side to the surface of the first steel sheet contacting the second steel sheet when overlaying the first steel sheet and the second steel sheet.

(5) The method of (3) wherein the reinforcing material is joined to a surface of the first steel sheet at the opposite side to the surface of the first steel sheet contacting the second steel sheet when overlaying the first steel sheet and the second steel sheet at the overlaid surfaces at the reinforcing material and first steel sheet.

(6) The method of (1) or (2) wherein the reinforcing part is a weld bead formed at the surface of the first steel sheet at the opposite side to the surface overlaid with the second steel sheet.

(7) The method of (1) or (2) wherein the reinforcing part is formed by working the first steel sheet.

(8) A fillet welded joint comprising a first steel sheet and a second steel sheet fillet welded together, the first steel sheet having tensile strength of 780 MPa or more, the fillet welded joint comprising a reinforcing part joined to a surface of the first steel sheet at an opposite side to a surface of the first steel sheet contacting the second steel sheet when overlaying the first steel sheet and the second steel sheet; and a fillet weld zone among an end part of the first steel sheet, a surface of the second steel sheet, and an end part of the reinforcing material.

(9) The fillet welded joint of (8), wherein $(D_T \times H_F)/(D_1 \times H_S)$ is 1.50 or more wherein $D_T$ (mm) is a throat thickness of a fillet weld zone formed by the fillet welding, $H_F$ (HV) is an average hardness of the fillet weld zone, $D_1$ (mm) is a thickness of the first steel sheet, and $H_S$ (HV) a smaller hardness of a hardness of a HAZ softened part of the fillet weld zone of the first steel sheet and the hardness of the base material of the first steel sheet.

(10) The fillet welded joint of (8) or (9), wherein the reinforcing part is a reinforcing material.

(11) The fillet welded joint of (10), wherein an end part of the reinforcing material is fillet welded to a surface of the first steel sheet at the opposite side to the surface of the first steel sheet contacting the second steel sheet when overlaying the first steel sheet and the second steel sheet.

(12) The fillet welded joint of (10), wherein the reinforcing material is a reinforcing material joined to the surface of the first steel sheet at the opposite side to the surface of the first steel sheet contacting the second steel sheet when overlaying the first steel sheet and second steel sheet at the overlaid surfaces of the reinforcing material and first steel sheet.

(13) The fillet welded joint of (8) or (9), wherein the reinforcing part is a weld bead formed on the surface of the first steel sheet at the opposite side to the surface which is overlaid on the second steel sheet.

(14) The fillet welded joint of claim (8) or (9), wherein the reinforcing part is formed by working the first steel sheet.

Advantageous Effects of Invention

According to the present invention, a reinforcing part is provided on the surface of the high strength steel sheet and then fillet welding is performed, so concentration of stress at the root part can be avoided and the tensile strength can be improved without increasing the welding deformation of the welded joint.

BRIEF DESCRIPTION OF DRAWINGS

FIG. 3A shows the state providing the reinforcing material on the upper side surface of the upper side steel sheet, while FIG. 3B shows the state of fillet welding the upper side steel sheet, lower side steel sheet, and reinforcing material.

FIG. 7A shows the state of providing the reinforcing material at the upper side surface of the upper side steel sheet and joining it there, while FIG. 7B shows the state of fillet welding the upper side steel sheet, lower side steel sheet, and reinforcing material.

FIG. 11A shows the state of providing the reinforcing bead at the upper side surface of the upper side steel sheet, while FIG. 11B shows the state of fillet welding the upper side steel sheet, lower side steel sheet, and reinforcing bead.

FIG. 15 Views explaining the throat thickness of a fillet weld zone, wherein FIG. 15A is a view of the case where the weld bead is convex in shape, FIG. 15B is a view of the case where the weld bead is concave in shape, and FIG. 15C is a view of the case where there is a gap between the upper side steel sheet and the lower side steel sheet.

FIG. 1 A view showing a comparative example welding the upper side steel sheet and the lower side steel sheet by multilayer buildup welding.

DESCRIPTION OF EMBODIMENTS

The fillet welding method of the present invention (below, referred to as "the welding method of the present invention") is a method of
(i) overlaying a first steel sheet, comprised of high strength steel sheet on which a reinforcing part is provided on the surface at the opposite side to the surface to be overlaid with the second steel sheet, and a second steel sheet and (ii) fillet welding an end part of the reinforcing material, an end part of the first steel sheet, and a surface of the second steel sheet to cover them with weld metal.

Due to this, it is possible to avoid concentration of stress at the root part and thereby improve the tensile strength without causing an increase in the welding deformation of the welded joint. Note that, below, the first steel sheet will also be referred to as the "upper side steel sheet", the second steel sheet will also be referred to as the "lower side steel sheet", the first steel sheet side will be referred to as the "upper side", and the second steel sheet side will be referred to as the "lower side".

Next, the history of the studies leading up to the welding method of the present invention will be explained and the basic configuration of the welding method of the present invention will be explained.

In lap fillet welded joints, it has been desired to improve the tensile strength without causing an increase in the welding deformation. Art for increasing the thickness of the weld metal to improve the joint strength has been known in the past, but welding so that the weld metal becomes thicker requires an increase in the heat input and sometimes the welding deformation increased.

The inventors thought that increasing the thickness of the weld metal would disperse the stress concentrated at the root part and improve the tensile strength and studied means for causing dispersion of the stress concentrated at the root part and suppressing welding deformation. As a result, they came up with the idea of providing a reinforcing part at the upper side surface of the upper side steel sheet and then performing fillet welding.

First, one example of the method of providing the reinforcing part and then performing fillet welding will be explained using the drawings.

Figure 3:
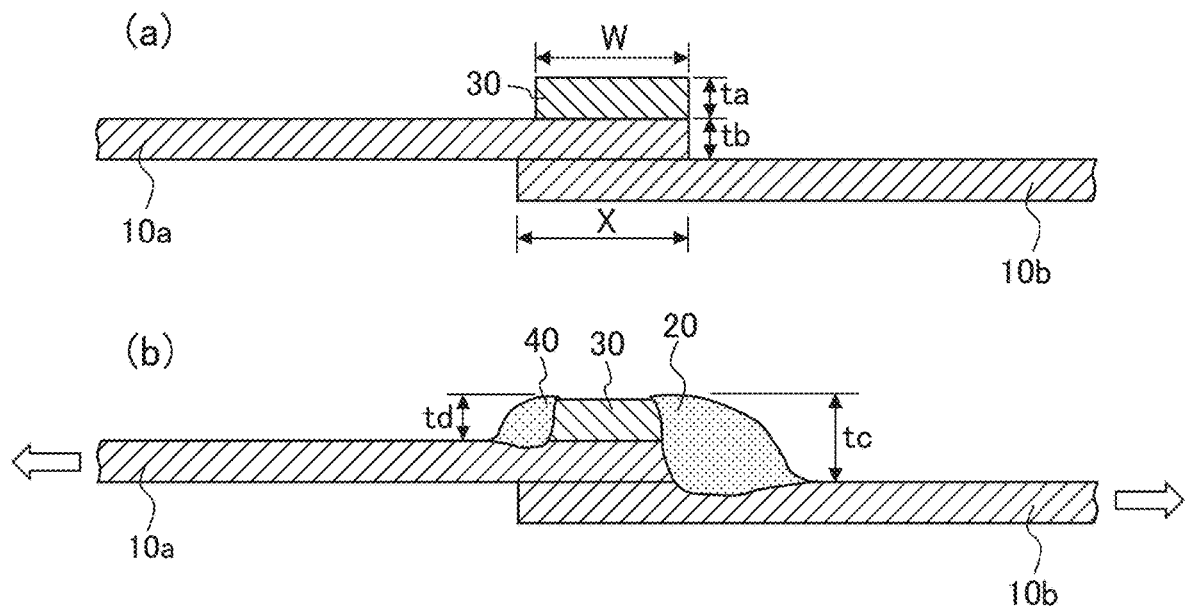
FIG. 3 Views showing one example of providing an upper side surface of an upper side steel sheet with a reinforcing material and then performing fillet welding.

FIGS. 3A and 3B show one example of provision of a reinforcing part comprised of a reinforcing material fillet welded at its end part to the upper side surface of the upper side steel sheet and fillet welding the end part of the reinforcing part, the end part of the upper side steel sheet, and the surface of the lower side steel sheet so as to cover them with weld metal. FIG. 3A shows the state of providing the reinforcing part at the upper side surface of the upper side steel sheet, while FIG. 3B shows the state of fillet welding the upper side steel sheet, lower side steel sheet, and reinforcing part.

The reinforcing part is provided by, as shown in FIG. 3A, providing a reinforcing material 30 at the upper side of the upper side steel sheet 10a, as shown in FIG. 3B, fillet welding the surface of the upper side steel sheet 10a and one end part of the reinforcing material 30, and forming the fillet weld zone 40 to fix the reinforcing material 30 to the upper side steel sheet 10a. Next, the other end part of the reinforcing material 30, the end part of the upper side steel sheet 10a, and the surface of the lower side steel sheet 10b are fillet welded to form the fillet weld zone 20 and obtain a fillet welded joint. Note that the "fillet weld zone 20" shows where there is a weld bead.

Next, the result of providing a reinforcing part and fillet welding to prepare a test piece and run a tensile test will be explained.

Figure 1:
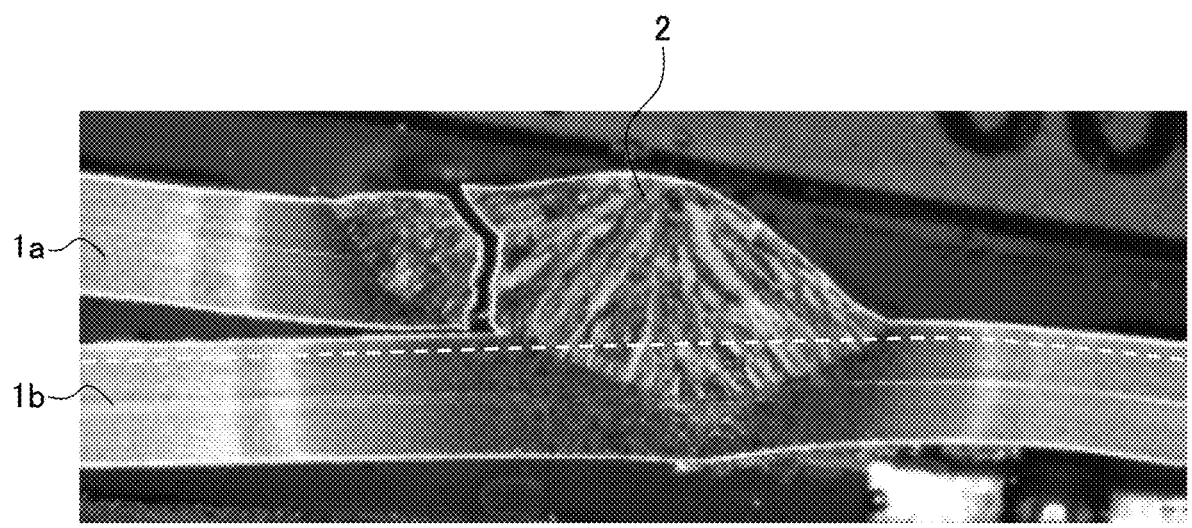
FIG. 1 A photograph showing a state of a test piece obtained by fillet welding after a tensile test.

First, two tensile strength 1180 MPa class thickness 1.6 mm steel sheets the same as the test piece shown in FIG. 1 were prepared. Further, as shown in FIGS. 3A and 3B, a reinforcing material was provided at the upper side of the upper side steel sheet and the end part of the reinforcing material and the surface of the upper side steel sheet were arc welded and fastened using wire for high strength steel sheet use. Next, the fastened upper side steel sheet and reinforcing material were overlaid on the lower side steel sheet and the end part of the reinforcing material, end part of the upper side steel sheet, and surface of the lower side steel sheet were arc welded and joined using wire for high strength steel sheet use in the same way as the above.

The prepared test piece was subjected to a tensile test by a tensile speed of 10 mm/min while applying a tensile load in the direction shown by the arrow of FIG. 3B. As a result, the test piece did not fracture at the weld metal. When applying a load of 47 kN, it fractured at the weld heat affected zone (HAZ) of the other steel sheet (base material).

As explained above, the inventors discovered that when not using a reinforcing material (FIG. 1), the test piece fractures at the weld metal when applying a load of 28 kN and that by using a reinforcing material, concentration of stress at the root part can be avoided and the tensile strength is improved.

The present invention reached the inventions described in (1) and (2) through the above process of study. Such a welding method of the present invention and the fillet welded joint of the present invention (below, referred to as the "joint of the present invention") and, further, the necessary requirements and desirable requirements will be successively explained.

First, the shape, dimensions, and arrangement of the reinforcing material, the relationship with the fillet weld zone, and the chemical composition of a reinforcing part comprised of a reinforcing material fillet welded to the upper side steel sheet will be explained.

Shape and Dimensions of Reinforcing Material

The preferable shape of the reinforcing material provided at the upper side surface of the upper side steel sheet will be explained using FIGS. 3A and 3B.

The shape of the reinforcing material is not particularly limited. In FIGS. 3A and 3B, the cross-sectional shape is a rectangular shape, but it is also possible to employ any other shape such as a trapezoidal shape. Further, the shape of the reinforcing material when viewed by a plan view from the upper side is not particularly limited. Any shape such as a rectangular shape or semicircular shape may also be employed.

The width W of the reinforcing material 30 in the tensile direction contacting the overlaid surface with the upper side steel sheet 10a is preferably at least the thickness tb of the upper side steel sheet 10a so as to make the stress at the root part of the weld bead formed by the fillet welding efficiently disperse. The width W of the reinforcing material 30 is preferably not more than the maximum overlap X of the upper side steel sheet 10a and the lower side steel sheet 10b in the tensile direction so as to reduce the weight of the fillet welded joint. Further, the width W of the reinforcing material 30 does not have to be constant in the length direction of the fillet weld zone.

The thickness ta of the reinforcing material 30 of the end part at the side welded with the lower side steel sheet 10b is preferably at least half (tb×0.5) of the thickness tb of the upper side steel sheet 10a for improving the tensile strength. The thickness ta of the reinforcing material 30 is preferably not more than 2 times (tb×2.0) the thickness tb of the upper side steel sheet 10a for reducing the weight of the fillet welded joint. Further, the thickness ta of the reinforcing material 30 does not have to be constant in the length direction of the weld bead.

Placement of Reinforcing Material

The position of the end part of the reinforcing material 30 at the side welded with the lower side steel sheet 10b is preferably aligned with the position of the end part of the upper side steel sheet 10a. However, if the end part of the reinforcing material 30 is positioned in the range of ±2 mm in the tensile direction from the position of the end part of the upper side steel sheet 10a, a welded joint with a sufficient tensile strength can be obtained.

Relationship of Reinforcing Material and Fillet Weld Zone

The height tc of the fillet weld zone 20 from the surface of the lower side steel sheet 10b shown in FIG. 3B is made over the thickness tb of the upper side steel sheet 10a so as to improve the tensile strength. The height tc of the fillet weld zone 20 is preferably made equal to the sum (ta+tb) of the thickness tb of the upper side steel sheet 10a and the thickness ta of the reinforcing material. The height tc of the fillet weld zone 20 is preferably not more than 2 times [(ta+tb)×2.0] the sum of the thickness tb of the upper side steel sheet 10a and the reinforcing material ta so as to suppress welding deformation. Further, the height tc of the fillet weld zone 20 does not have to be constant in the length direction of the fillet weld zone 20.

The height td of the fillet weld zone 40 from the surface of the upper side steel sheet 10a is not particularly limited. So long as a height where the upper side steel sheet 10a and the reinforcing material 30 are joined, it is preferably made equal to the thickness ta of the reinforcing material 30.

Figure 4:
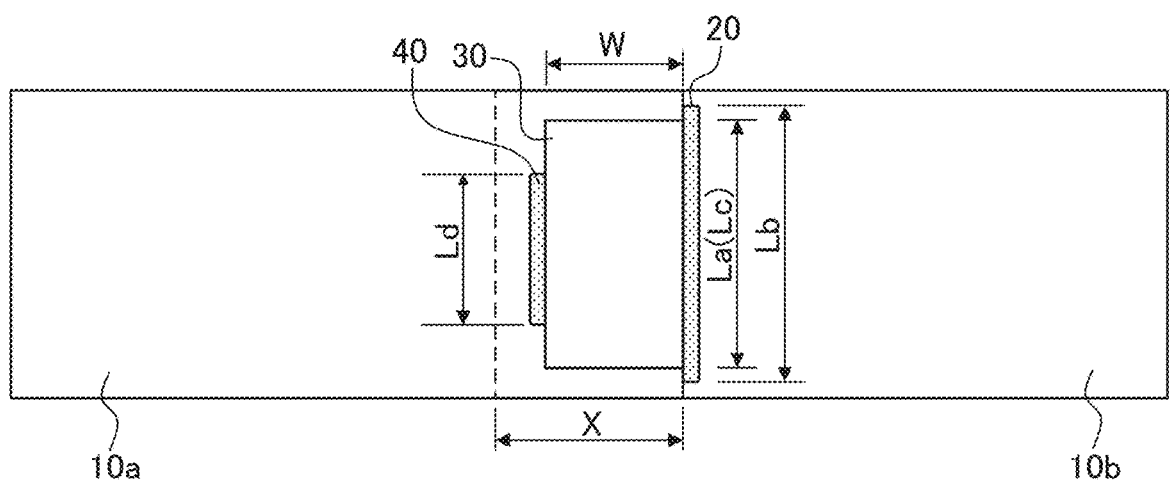
FIG. 4 A plan view showing one example of a welded joint obtained by providing a reinforcing material on the upper side surface of the upper side steel sheet and fillet welding the upper side steel sheet, lower side steel sheet, and reinforcing material.

FIG. 4 is a plan view of one example of a welded joint obtained by providing a reinforcing material at the upper side surface of the upper side steel sheet and fillet welding the upper side steel sheet, lower side steel sheet, and reinforcing material. FIG. 4 is a view when looking at the welded joint from the upper side by a plan view. The length La of the reinforcing material 30 along the end part of the side welded with the upper side steel sheet 10a is preferably at least half (Lb×0.5) of the total length Lb of the fillet weld zone 20 in the welding direction for improving the tensile strength. The length La of the reinforcing material 30 is preferably not more than 2 times (Lb×2.0) the total length Lb of the fillet weld zone 20 for reducing the weight of the fillet welded joint.

In FIG. 4, the length Lc of the fillet weld zone 20 joining the reinforcing material 30, upper side steel sheet 10a, and lower side steel sheet 10b (length Lc of fillet weld zone of reinforcing material) and the length La of the reinforcing material 30 are shown as matching, but the two lengths need not match. The length Lc of the fillet weld zone 20 is preferably made at least half (Lb×0.5) of the total length Lb of the fillet weld zone 20 so as to improve the tensile strength. Further, the length Lc of the fillet weld zone 20 more preferably matches the total length Lb of the fillet weld zone 20.

Further, the total length Lb of the fillet weld zone 40 in the welding direction (total length Ld of fillet weld zone of reinforcing material) is not particularly limited. The upper side steel sheet 10a and the reinforcing material 30 need only be joined. The length is preferably made equal to the length La of the reinforcing material 30.

Figure 5:
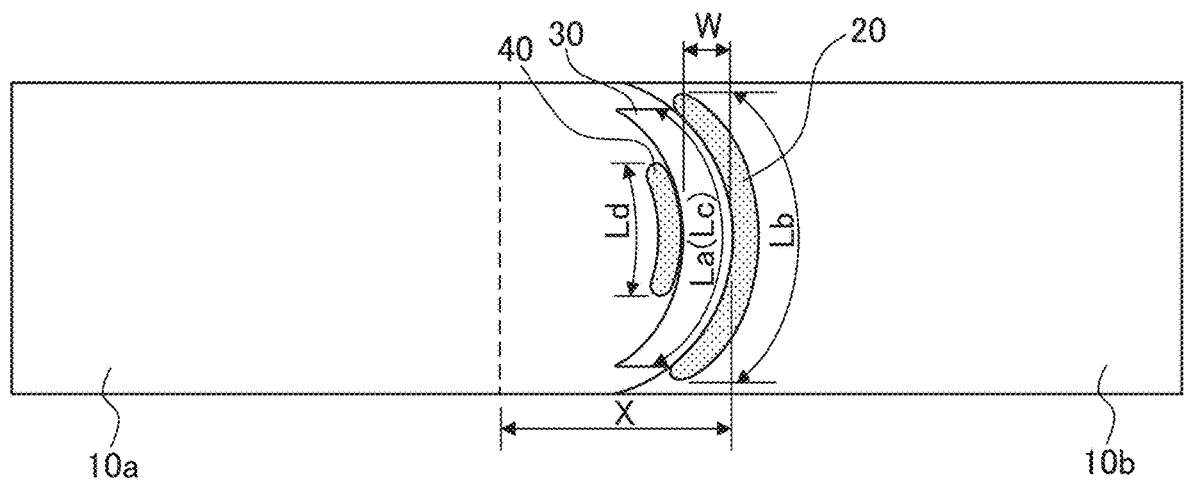
FIG. 5 A plan view showing one example of a welded joint obtained by providing a curved reinforcing material on the upper side surface of the upper side steel sheet and fillet welding the upper side steel sheet, lower side steel sheet, and reinforcing material.

FIG. 5 shows a plan view of one example of a welded joint obtained by providing a curved reinforcing material at the upper side surface of the upper side steel sheet and fillet welding the upper side steel sheet, lower side steel sheet, and reinforcing material. FIG. 5 is a view when looking at the welded joint from the upper side by a plan view. As shown in FIG. 5, when looking at the end part of the upper side steel sheet 10a at the side to be welded from the upper side by a plan view, if that end part is curved, it is preferable to provide a reinforcing material 30 curved etc. along the end part of the upper side steel sheet 10a at the side to be welded. Further, the relationship between the length La of the reinforcing material 30 and the total length Lb of the fillet weld zone 20, the relationship between the length Lc of the fillet weld zone and the total length Lb of the fillet weld zone and the total length Ld of the fillet weld zone 40 may be made similar to those explained using FIG. 4.

Figure 6:
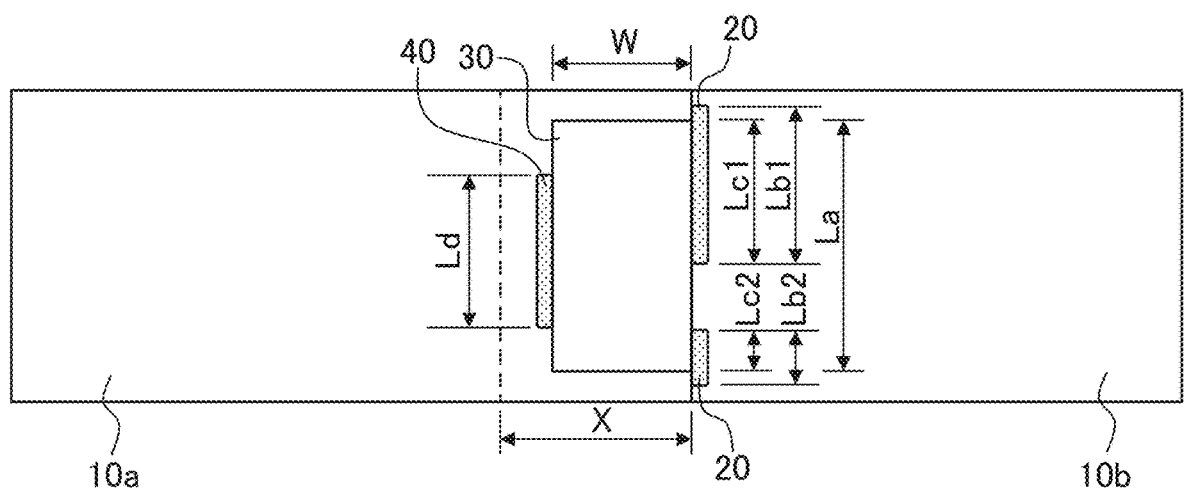
FIG. 6 A plan view showing one example of a welded joint obtained by providing a reinforcing material on the upper side surface of the upper side steel sheet and discontinuously fillet welding the upper side steel sheet, lower side steel sheet, and reinforcing material.

FIG. 6 is a plan view of one example of a welded joint obtained by providing a reinforcing material at the upper side surface of the upper side steel sheet and discontinuously fillet welding the upper side steel sheet, lower side steel sheet, and reinforcing material. As shown in FIG. 6, the fillet weld zone 20 may also be discontinuous. Further, the length (Lc1+Lc2) of the fillet weld zone 20 of the reinforcing material 30, upper side steel sheet 10a, and lower side steel sheet 10b is preferably made at least half [(Lb1+Lb2)×0.5] of the total length of the fillet weld zone 20 (Lb1+Lb2) for improving the tensile strength. Further, the length of the fillet weld zone (Lc1+Lc2) more preferably matches the total length (Lb1+Lb2) of the fillet weld zone 20. Note that, the number of sections of the discontinuous fillet weld zone 20 is not particularly limited.

Chemical Composition Etc. of Reinforcing Material

The chemical composition of the reinforcing material is not particularly limited. Steel sheets of various chemical compositions etc. may be employed. Further, metal members other than steel sheets may also be employed. Further, the reinforcing material may also be one formed with a surface treatment coating such as plating on the surface.

Other Embodiment 1 of Reinforcing Part

Next, the reinforcing part obtained by joining the reinforcing material to the upper side steel sheet at the overlaid surfaces will be explained.

Shape and Dimensions of Reinforcing Material

A preferable shape of the reinforcing material provided at the upper side surface of the upper side steel sheet will be explained using FIGS. 7A and 7B.

The shape of the reinforcing material is not particularly limited. In FIGS. 7A and 7B, the cross-sectional shape is a rectangular shape, but any shape such as a trapezoidal shape may also be employed. Further, the shape of the reinforcing material when viewed from the upper side by a plan view is not particularly limited. Any shape such as a rectangular shape and semicircular shape may be employed.

The width W of the reinforcing material 130 in the tensile direction contacting the overlaid surface with the upper side steel sheet 10a is preferably at least the thickness tb of the upper side steel sheet 10a so as to efficiently disperse the stress at the root part of the weld bead formed by the fillet welding. The width W of the reinforcing material 130 is preferably not more than the maximum overlap X of the upper side steel sheet 10a and lower side steel sheet 10b in the tensile direction for reducing the weight of the fillet welded joint. Further, the width W of the reinforcing material 130 does not have to be constant in the length direction of the fillet weld zone.

Figure 7:
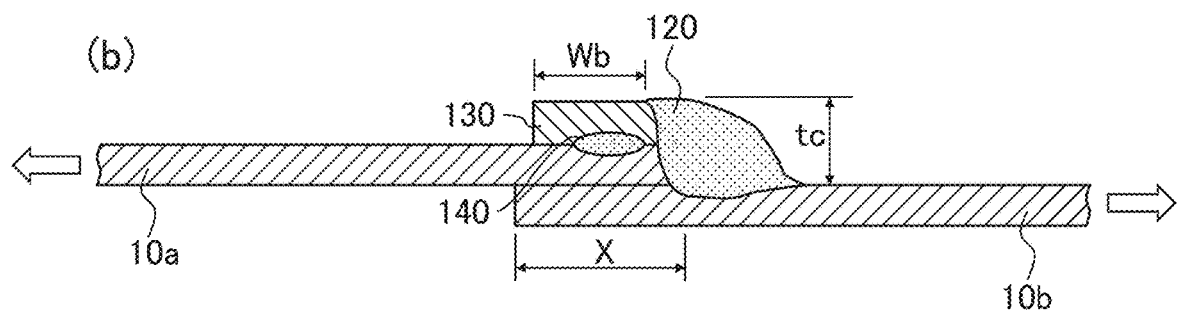
FIG. 7 Views showing one example of providing a reinforcing material at the upper side steel surface of the upper side steel sheet and fillet welding them.

In FIG. 7A, the (right side) thickness ta of the reinforcing material 130 is preferably at least half (tb×0.5) of the thickness tb of the upper side steel sheet 10a for improving the tensile strength. The thickness ta of the reinforcing material 130 is preferably not more than 2 times (tb×2.0) the thickness tb of the upper side steel sheet 10a for reducing the weight of the fillet welded joint. Further, the thickness ta of the reinforcing material 130 does not have to be constant in the length direction of the weld bead.

Placement of Reinforcing Material

In FIG. 7B, the position of the (right side) end part of the reinforcing material 130 is preferably aligned with the position of the (right side) end part of the upper side steel sheet 10a. However, if the end part of the reinforcing material 130 is positioned within a range of ±2 mm in the tensile direction from the position of the end part of this upper side steel sheet 10a, a welded joint with a sufficient tensile strength can be obtained.

Relationship of Reinforcing Material and Fillet Weld Zone and Joined Parts

The height tc of the fillet weld zone 120 from the surface of the lower side steel sheet 10b shown in FIG. 7B is made over a thickness tb of the upper side steel sheet 10a for improving the tensile strength. The height tc of the fillet weld zone 120 is preferably made equal to the sum (ta+tb) of the thickness tb of the upper side steel sheet 10a and the thickness ta of the reinforcing material. The height tc of the fillet weld zone 120 is preferably not more than 2 times [(ta+tb)×2.0] the sum of the thickness tb of the upper side steel sheet 10a and the reinforcing material ta so as to suppress welding deformation. Further, the height tc of the fillet weld zone 120 does not have to be constant in the longitudinal direction of the fillet weld zone 120.

The joined part 140 formed by the overlaid surfaces of the reinforcing material 130 and upper side steel sheet 10a need only be formed so that the two are joined. The position and width etc. in the width W direction of the reinforcing material 130 are not particularly limited. The width Wa of the weld zone 140 in the width W direction of the reinforcing material 130 is preferably a width of 0.1 time or more of the unmelted width Wb of the reinforcing material 130 (width of portion other than portion melted by fillet welding in width W of reinforcing material). Further, the position of the end part of the weld zone 140 at the fillet weld zone side in the width W direction of the reinforcing material 130 is preferably made a position at the overlaid surfaces separated from the end part of the reinforcing material 130 at the fillet weld zone side by at least 0.1 time the unmelted width Wb of the reinforcing material 130.

Figure 8:
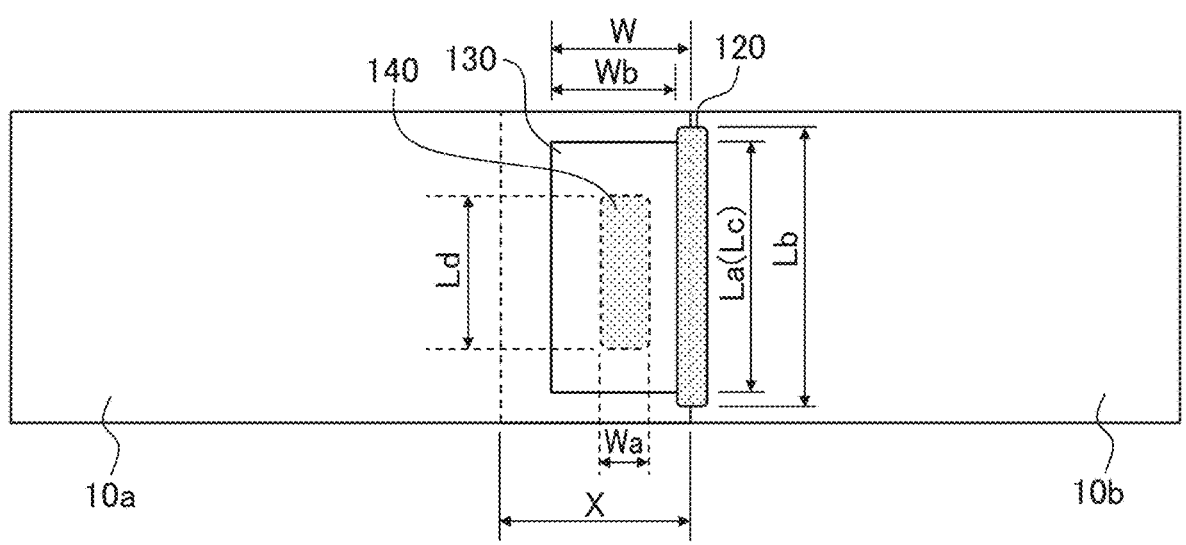
FIG. 8 A plan view showing one example of a welded joint obtained by providing the reinforcing material on the upper side surface of the upper side steel sheet and fillet welding the upper side steel sheet, lower side steel sheet, and reinforcing material.

FIG. 8 shows a plan view of one example of a welded joint obtained by providing a reinforcing material at the upper side surface of the upper side steel sheet and fillet welding the upper side steel sheet, lower side steel sheet, and reinforcing material. FIG. 8 is a view when looking at the welded joint from the upper side by a plan view. Further, the joined part is projected at the upper side surface of the reinforcing material. The length La of the reinforcing material 130 along the end part of the upper side steel sheet 10a at the side to be welded is preferably at least half (Lb×0.5) of the total length Lb of the fillet weld zone 120 in the welding direction for improving the tensile strength. The length La of the reinforcing material 130 is preferably not more than 2 times (Lb×2.0) the total length Lb of the fillet weld zone 120 for reducing the weight of the fillet welded joint.

In FIG. 8, the length Lc of the fillet weld zone 120 joining the reinforcing material 130, upper side steel sheet 10a, and lower side steel sheet 10b (length Lc of fillet weld zone of reinforcing material) and the length La of the reinforcing material 130 are shown as matching, but the lengths of the two need not match. The length Lc of the fillet weld zone 120 is preferably made at least half (Lb×0.5) of the total length Lb of the fillet weld zone 120 for improving the tensile strength. Further, the length Lc of the fillet weld zone 120 more preferably matches the total length Lb of the fillet weld zone 120.

Further, the total length Ld of the joined part 140 in the welding direction is not particularly limited. It is sufficient that the upper side steel sheet 10*a* and the reinforcing material 130 be joined. The length is preferably made equal to the length La of the reinforcing material 130.

Figure 9:
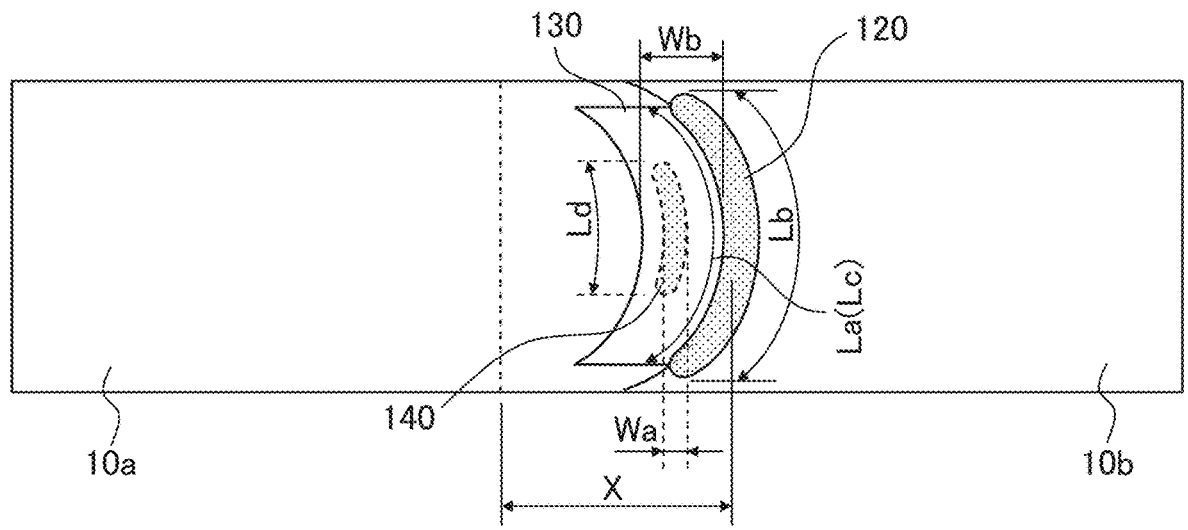
FIG. 9 A plan view showing one example of a welded joint obtained by providing a curved reinforcing material on the upper side surface of the upper side steel sheet and fillet welding the upper side steel sheet, lower side steel sheet, and reinforcing material.

FIG. 9 shows a plan view of one example of a welded joint obtained by providing a curved reinforcing material at the upper side surface of the upper side steel sheet and fillet welding the upper side steel sheet, lower side steel sheet, and reinforcing material. FIG. 9 is a view when looking at the welded joint from the upper side by a plan view. Further, the joined parts are projected on the upper side surface of the reinforcing material. As shown in FIG. 9, when viewing the end part of the upper side steel sheet 10*a* at the side to be welded from the upper side by a plan view, if the end part is curved, it is preferable to provide a curved or other reinforcing material 130 along the end part of the upper side steel sheet 10*a* at the welding side. Further, the relationship between the length La of the reinforcing material 130 and the total length Lb of the fillet weld zone 120, the relationship of the length Lc of the fillet weld zone and the total length Lb of the fillet weld zone, and the total length Ld of the joined parts 140 may be made similar to those explained using FIG. 8.

Figure 10:
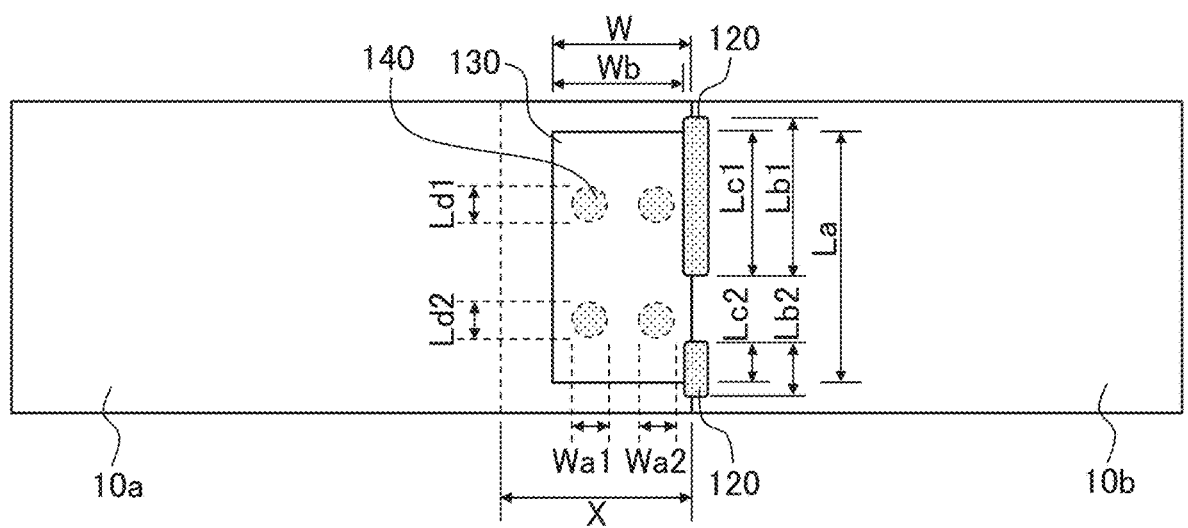
FIG. 10 A plan view showing one example of a welded joint obtained by providing a reinforcing material on the upper side surface of the upper side steel sheet and discontinuously fillet welding the upper side steel sheet, lower side steel sheet, and reinforcing material.

FIG. 10 is a plan view of one example of a welded joint obtained by providing a reinforcing material at the upper side surface of the upper side steel sheet and discontinuously fillet welding the upper side steel sheet, lower side steel sheet, and reinforcing material. As shown in FIG. 10, the fillet weld zone 120 may also be discontinuous. Further, the length (Lc1+Lc2) of the fillet weld zone 120 of the reinforcing material 130, upper side steel sheet 10*a*, and lower side steel sheet 10*b* is preferably at least half [(Lb1+Lb2)× 0.5] of the total length of the fillet weld zone 120 (Lb1+Lb2) for improving the tensile strength. Further, the length of the fillet weld zone (Lc1+Lc2) more preferably matches the total length (Lb1+Lb2) of the fillet weld zone 120. Note that the number of sections of the discontinuous fillet weld zone 120 is not particularly limited.

Further, in FIG. 10, further, the joined part is projected on the upper side surface of the reinforcing material. The joined part 140 may also be discontinuous. Further, the length of the joined part 140 (Ld1+Ld2) is not particularly limited. The upper side steel sheet 10*a* and the reinforcing material 130 need only be joined. The length is preferably at least 0.1 time the length La of the reinforcing material 130. The width of the joined part 140 (Wa1+Wa2) is not particularly limited. The upper side steel sheet 10*a* and the reinforcing material 130 need only be joined. The width is preferably at least 0.1 time the unmelted width Wb of the reinforcing material 130. Note that the number of discontinuous sections of the joined part 140 is not particularly limited.

Chemical Composition Etc. of Reinforcing Material

The chemical composition of the reinforcing material is not particularly limited. Steel sheets of various chemical compositions etc. can be employed. Further, metal members other than steel sheets may also be employed. Further, the reinforcing material may be one formed with a surface treatment coating such as plating on its surface.

Other Embodiment 2 of Reinforcing Part

Next, an embodiment using a weld bead (reinforcing bead) formed separate from the fillet weld zone at the surface of the upper side steel sheet as a reinforcing part will be explained.

Shape and Dimensions of Reinforcing Bead

The preferable shape of the reinforcing bead provided at the upper side surface of the upper side steel sheet will be explained using FIGS. 11A and 11B.

The shape of the reinforcing bead is not particularly limited. The cross-sectional shape may be made a conventional peak shape such as shown in FIGS. 11A and 11B. Further, the shape of the reinforcing bead when viewed from the upper side by a plan view is not particularly limited. A straight line shape, curved shape, or any other shape may also be employed.

The maximum width W' of the reinforcing bead 230 in the tensile direction is preferably at least the thickness tb of the upper side steel sheet 10*a* for efficiently dispersing the stress at the root part of the fillet weld bead. The maximum width W' of the reinforcing bead 230 is preferably not more than the maximum overlay X of the upper side steel sheet 10*a* and the lower side steel sheet 10*b* in the tensile direction for reducing the weight of the fillet welded joint. Further, the maximum width W of the reinforcing bead 230 does not have to be constant in the length direction of the fillet weld zone.

To increase the width of the reinforcing bead 230, it is possible to employ a parallel bead or weaving bead. Further, the reinforcing bead may be obtained using not only an arc heat source, but also any other heat source such as laser buildup utilizing a laser heat source. For the filler material, a rod shaped, wire, powder, or other material may be employed.

The maximum height ta' of the reinforcing bead 230 is preferably at least half (tb×0.5) of the thickness tb of the upper side steel sheet 10*a* for improving the tensile strength. The maximum height ta of the reinforcing bead 230 is preferably not more than 2 times (tb×2.0) the thickness tb of the upper side steel sheet 10*a* for reducing the weight of the fillet welded joint. Further, the maximum height ta' of the reinforcing bead 230 does not have to be constant in the length direction of the weld bead.

Placement of Reinforcing Bead

The position of the toe end 240 of the reinforcing bead 230 at the side fillet welded with the lower side steel sheet 10*b* is preferably aligned with the position of the end part of the upper side steel sheet 10*a*. However, a welded joint of a sufficient tensile strength can be obtained if the toe end of the reinforcing bead 230 is positioned in a range of 2 mm from the end part of the upper side steel sheet 10*a*.

Relationship of Reinforcing Bead and Fillet Weld Zone

Figure 11:
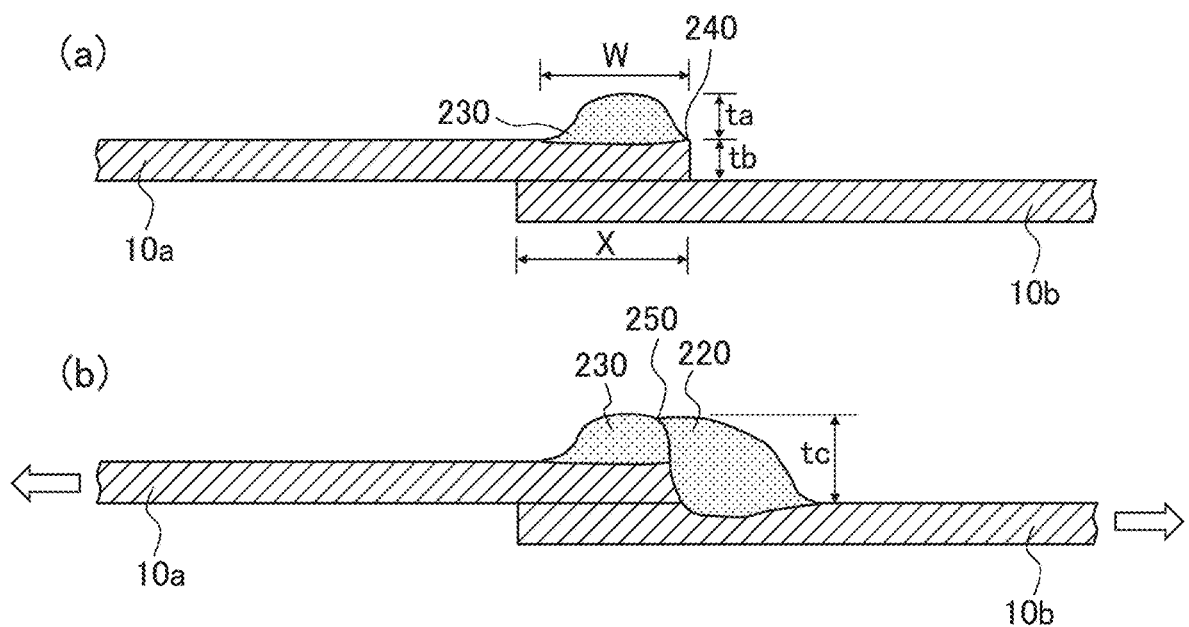
FIG. 11 Views showing one example of providing a reinforcing bead at the upper side surface of the upper side steel sheet and then performing fillet welding.

The height tc of the fillet weld zone 220 from the surface of the lower side steel sheet 10*b* shown in FIG. 11B is made over the thickness tb of the upper side steel sheet 10*a* for improving the tensile strength. The height tc of the fillet weld zone 220 is preferably at least 1.2 times (tb×1.2) the thickness tb of the upper side steel sheet 10*a*. It is more preferably made equal to the sum (ta'+tb) of the thickness tb of the upper side steel sheet 10*a* and the maximum height ta' of the reinforcing bead. The height tc of the fillet weld zone 220 is preferably not more than 2 times [ta'+tb)×2.0] the sum of the thickness tb of the upper side steel sheet 10*a* and the reinforcing bead ta for suppressing welding deformation. Further, the height tc of the fillet weld zone 220 does not have to be constant in the length direction of the fillet weld zone 220.

Further, the toe part 250 of the fillet weld zone 220 at the side contacting the reinforcing bead 230 is preferably formed at the surface of the reinforcing bead 230 from the position showing the maximum height ta of the reinforcing bead 230 to the toe end 240 of the reinforcing bead 230.

Figure 12:
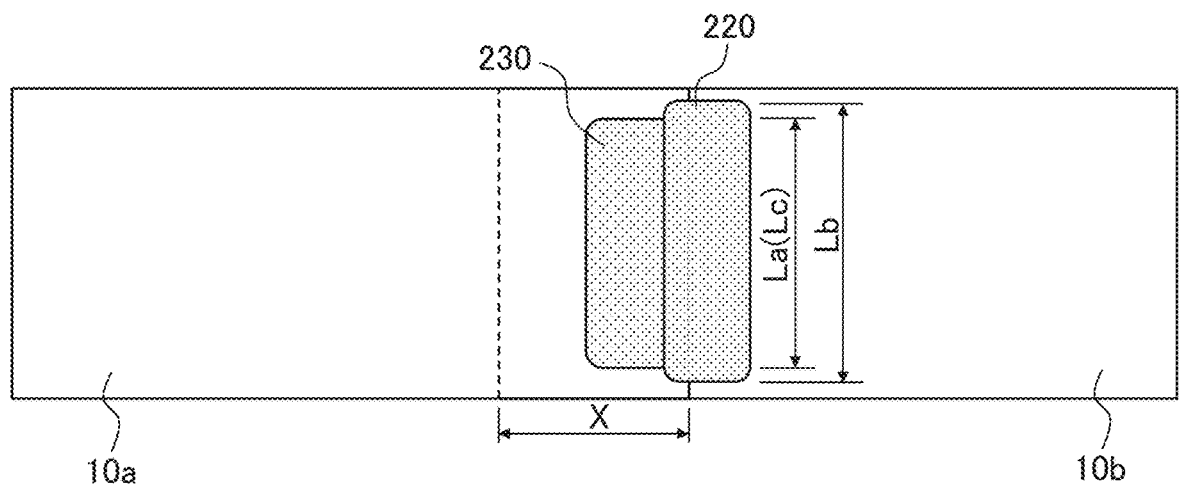
FIG. 12 A plan view showing one example of a welded joint obtained by forming a reinforcing bead on the upper side surface of the upper side steel sheet and fillet welding the upper side steel sheet, lower side steel sheet, and reinforcing bead.

FIG. 12 shows a plan view of one example of a welded joint obtained by forming a reinforcing bead on the upper side surface of the upper side steel sheet and fillet welding the upper side steel sheet, lower side steel sheet, and reinforcing bead. FIG. 12 is a view when looking at the welded joint from the upper side by a plan view. The length La of the reinforcing bead 230 along the end at the welded side of the upper side steel sheet 10a is preferably at least half (Lb×0.5) of the total length Lb of the fillet weld zone 220 in the welding direction for improving the tensile strength. The length La of the reinforcing bead 230 is preferably not more than 2 times (Lb×2.0) the total length Lb of the fillet weld zone 220 for reducing the weight of the fillet welded joint.

In FIG. 12, the length Lc of the fillet weld zone 220 joining the reinforcing bead 230, upper side steel sheet 10a, and lower side steel sheet 10b (length Lc of fillet weld zone of reinforcing bead) and the length La of the reinforcing bead 230 are shown as matching, but the two lengths need not match. The length Lc of the fillet weld zone 220 is preferably made half or more of the total length Lb of the fillet weld zone 220 (Lb×0.5) so as to improve the tensile strength. Further, the length Lc of the fillet weld zone 220 more preferably matches with the total length Lb of the fillet weld zone 220.

Figure 13:
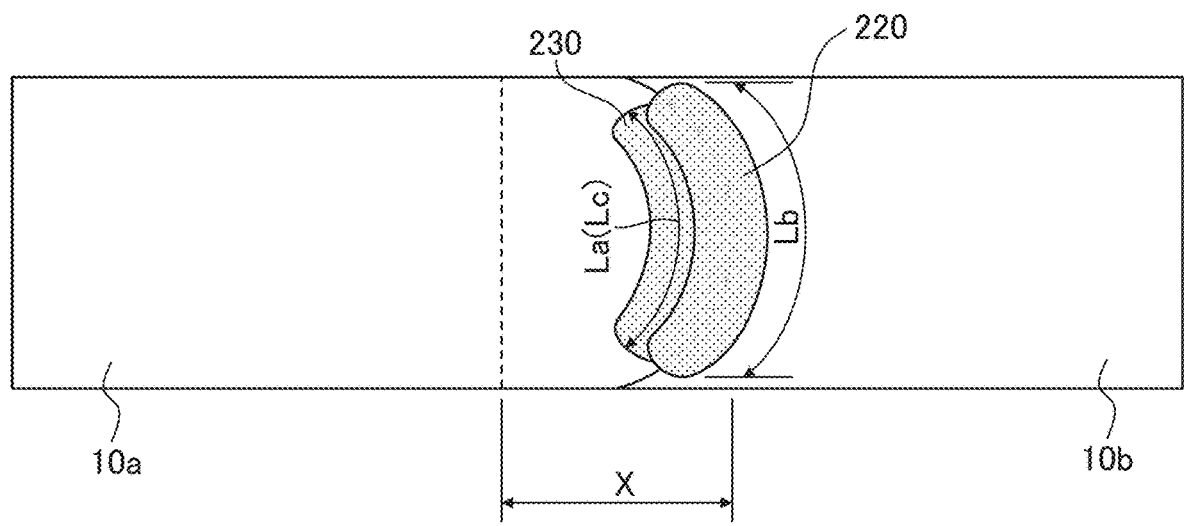
FIG. 13 A plan view showing one example of a welded joint obtained by forming a curved reinforcing bead on the upper side surface of the upper side steel sheet and fillet welding the upper side steel sheet, lower side steel sheet, and reinforcing bead.

FIG. 13 shows a plan view of one example of a welded joint obtained by forming a curved reinforcing bead on the upper side surface of the upper side steel sheet and fillet welding the upper side steel sheet, lower side steel sheet, and reinforcing bead. FIG. 13 is a view when viewing the welded joint from the upper side by a plan view. As shown in FIG. 13, when viewing the end part of the welding side of the upper side steel sheet 10a from the upper side by a plan view, if the end part is curved, it is preferable to form a reinforcing bead 230 curved etc. along the end of the welding side of the upper side steel sheet 10a. Further, the relationship between the length La of the reinforcing bead 230 and the total length Lb of the fillet weld zone 220 and the relationship between the length Lc of the fillet weld zone and the total length Lb of the fillet weld zone can be made similar to those explained using FIG. 12.

Figure 14:
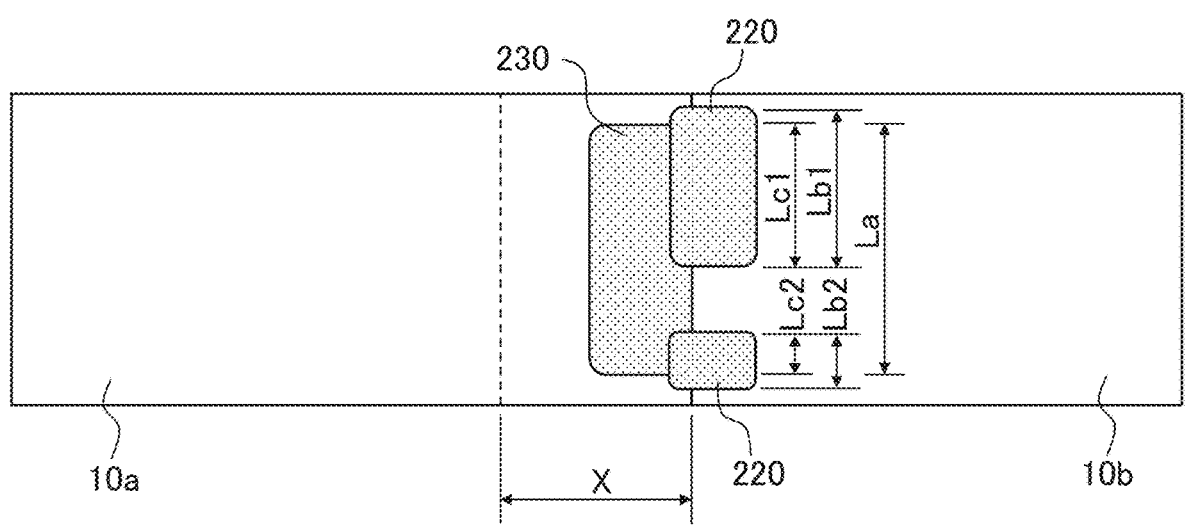
FIG. 14 A plan view showing one example of a welded joint obtained by forming a reinforcing bead on the upper side surface of the upper side steel sheet and discontinuously fillet welding the upper side steel sheet, lower side steel sheet, and reinforcing bead.

FIG. 14 is a plan view of one example of a welded joint obtained by forming a reinforcing bead on the upper side surface of the upper side steel sheet and discontinuously fillet welding the upper side steel sheet, lower side steel sheet, and reinforcing bead. As shown in FIG. 14, the fillet weld zone 220 may also be discontinuous. Further, the length (Lc1+Lc2) of the fillet weld zone 220 of the reinforcing bead 30, upper side steel sheet 10a, and lower side steel sheet 10b is preferably at least half [(Lb1+Lb2)×0.5] of the total length (Lb1+Lb2) of the fillet weld zone 220 for improving the tensile strength. Further, the length of the fillet weld zone (Lc1+Lc2) more preferably matches the total length of the fillet weld zone 220 (Lb1+Lb2). Note that the number of sections of the discontinuous fillet weld zone 220 is not particularly limited.

Chemical Composition of Reinforcing Bead Etc.

The chemical composition of the reinforcing bead is not particularly limited. Weld metals of various chemical compositions can be used. However, for the work efficiency in welding, it is preferable to form the reinforcing bead using the same welding wire as the welding wire used in forming the fillet weld zone and it is preferable to make the chemical composition of the weld metal equal to the chemical composition of the fillet weld zone.

Note that, as a mode similar in appearance to an example of use of a reinforcing bead as the reinforcing part of the present invention, the welding can be performed a plurality of times for so-called "multilayer buildup". If applied to the present invention, this is a mode of lap fillet welding the upper side steel sheet and lower side steel sheet, then forming a reinforcing bead on them.

However, in such multilayer buildup, the lap fillet welding of the upper side steel sheet and the lower side steel sheet is not performed so that the end part of the reinforcing part is covered with weld metal, so differs from the embodiment of the present invention. Further, in the present embodiment, when forming the reinforcing bead on the lap fillet weld zone, the martensite structures of the lap fillet weld zone are partially tempered resulting in the formation of softened regions, so the weld metal of the lap fillet weld zone easily fractures. That is, the effect of the present invention is not obtained.

As another embodiment of the reinforcing part, in addition to the embodiment explained above, the reinforcing part may be provided by working the steel sheet. For example, it is also possible to press-form the steel sheet so that the end part of the surface becomes convex and use the convex shaped end up as the reinforcing part.

Next, the welding method of the present invention and the steel sheet used in the joint of the present invention will be explained.

In the welding method of the present invention and the joint of the present invention, steel sheet with a tensile strength of 780 MPa or more (high strength steel sheet) is used for the upper side steel sheet. In a welded joint obtained by fillet welding using high strength steel sheet for the upper side steel sheet, when applying an excessive tensile load, the joint sometimes does not fracture at the base material but fractures at the weld metal, so improvement of the tensile strength of the welded joint is required. The lower side steel sheet is not particularly limited in chemical composition etc. It is possible to use high strength steel sheet similar to the upper side steel sheet.

The thicknesses of the upper side steel sheet and lower side steel sheet are not particularly limited and can be made 0.5 to 3.0 mm. Further, the thicknesses of the upper side steel sheet and lower side steel sheet as a whole are not particularly limited and can be made 1.0 to 6.0 mm. Further, the upper side steel sheet and lower side steel sheet may be made steel sheets formed with surface treated coatings such as plating on both surfaces or one surface. If blowholes would be formed due to plating, it is also possible to weld while leaving a gap between the sheets.

The steel sheets need only be ones which have flat portions at least at part and have parts where such flat portions are stacked with each other. They do not have to be flat as a whole. Further, the steel sheets are not limited to ones comprised of separate steel sheets. Single steel sheets formed into a predetermined shapes like a tube may be overlaid.

Next, the flow of the welding method of the present invention will be explained.

First, in the welding method of the present invention, the above-mentioned such upper side steel sheet and lower side steel sheet are prepared. For example, two thickness 1.6 mm tensile strength 1180 MPa unplated steel sheets are prepared. Next, a reinforcing material of a shape and dimensions corresponding to the fillet weld zone formed by fillet welding the reinforcing material, upper side steel sheet, and lower side steel sheet is prepared. For example, a reinforcing material having a cross-sectional shape in the thickness direction and shape when viewing the upper side from a plan view of a rectangular shape and a width W of 20 mm and a thickness to of 1.6 mm is prepared.

When forming a reinforcing part comprised of a fillet welded reinforcing material, the reinforcing material is overlaid on the upper side steel sheet and the surface of the upper side steel sheet and one end part of the reinforcing material are fillet welded. For example, they are fillet welded so that the height td of the fillet weld zone becomes the same height as the reinforcing material, that is, 1.6 mm. Next, the other end part of the reinforcing material, the end part of the upper side steel sheet, and the surface of the lower side steel sheet are fillet welded so as to give the above-mentioned relationship of the reinforcing material and fillet weld zone. For example, the height tc of the fillet weld zone is the sum of the thickness tb of the upper side steel sheet and the thickness ta of the reinforcing material, that is, 3.2 mm. The fillet welding is performed so that the length Lc of the fillet weld zone matches with the length La of the reinforcing material and the total length Lb of the fillet weld zone.

Note that, it is also possible to fillet weld the other end part of the reinforcing material, the end part of the upper side steel sheet, and the surface of the lower side steel sheet to give the above-mentioned relationship of the reinforcing material and fillet weld zone, then fillet weld the surface of the upper side steel sheet and one end part of the reinforcing material.

When forming a reinforcing part by joining a reinforcing material at the overlaid surfaces, the reinforcing material is overlaid on the upper side steel sheet and the overlaid surfaces of the upper side steel sheet and reinforcing material are joined. The joining method is not particularly limited. The joining may be performed by resistance welding such as spot welding or seam welding, may be performed by a method other than resistance welding such as laser welding, and may be performed by filling a binder into the overlaid surfaces to bind them. The conditions of the joining methods may be based on an ordinary method and are not particularly limited.

For example, in the case of joining members by spot welding, the reinforcing material is overlaid on the upper side steel sheet, then dome radius type electrodes with tip diameters of 6 to 8 mm comprised of copper alloys etc. are pushed by a pressing force of 1.5 to 6.0 kN so as to sandwich the two metal sheets from the two sides while running current for 5 to 50 cycles (power frequency of 50 Hz) at 4 to 15 kA to form molten metal. This is cooled to make it solidify and form a weld zone of a diameter of 5 mm or so. In this case, the width and length of the weld zone become equal.

Next, the end part of the reinforcing material and the surface of the lower side steel sheet, including the end part of the upper side steel sheet, are fillet welded to give the above-mentioned relationship of the reinforcing material and fillet weld zone. For example, the fillet welding is performed so that the height tc of the fillet weld zone is the sum of the thickness tb of the upper side steel sheet and the thickness ta of the reinforcing material, that is, 3.2 mm and so that the length Lc of the fillet weld zone matches the length La of the reinforcing material and the total length Lb of the fillet weld zone.

When forming a reinforcing part by a reinforcing bead, the reinforcing bead has to be formed before forming the fillet weld zone. Due to this, as shown in FIG. 11B, one toe end part 250 of the fillet weld zone 220 is positioned on the surface of the reinforcing bead 230.

Next, the surface of the reinforcing bead, the end part of the upper side steel sheet, and the surface of the lower side steel sheet are fillet welded so as to give the above-mentioned relationship between the reinforcing bead and fillet weld zone. For example, the fillet welding is performed so that the height tc of the fillet weld zone is the sum of the thickness tb of the upper side steel sheet and the thickness to of the reinforcing bead, that is, 3.2 mm and so that the length Lc of the fillet weld zone matches the length La of the reinforcing bead and the total length Lb of the fillet weld zone.

The conditions of the arc welding in the fillet welding may be based on the ordinary method and are not particularly limited. For example, as the shield gas, in addition to 100% $CO_2$ gas, a mixed gas of Ar gas and 3 to 20% $CO_2$ gas etc. may be used. As the welding current and voltage, values not resulting in undercut may be set.

The welding wire used is not particularly limited. Wire for high strength steel sheet may be used, but if employing one having a composition giving a Vickers hardness HV of the weld metal of less than 500, delayed fracture can be suppressed, that is, this preferable.

To improve the tensile strength of the lap fillet welded joint of the present invention, it may be considered to make the distance from the root part of the fillet weld zone to the surface of the fillet weld zone, that is, make the throat thickness become longer, to thereby disperse the stress concentrating at the root part.

Figure 15:
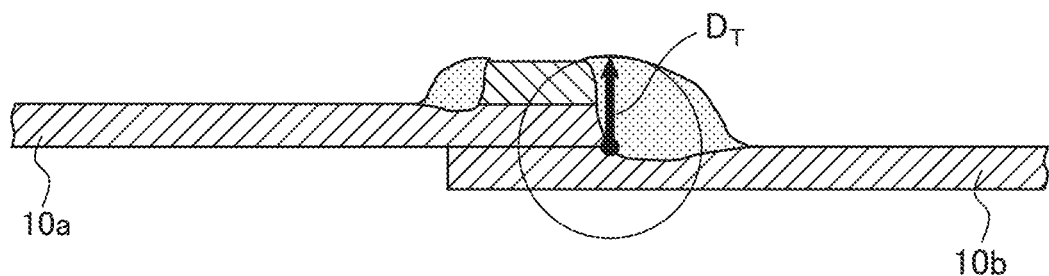
Figure 15:
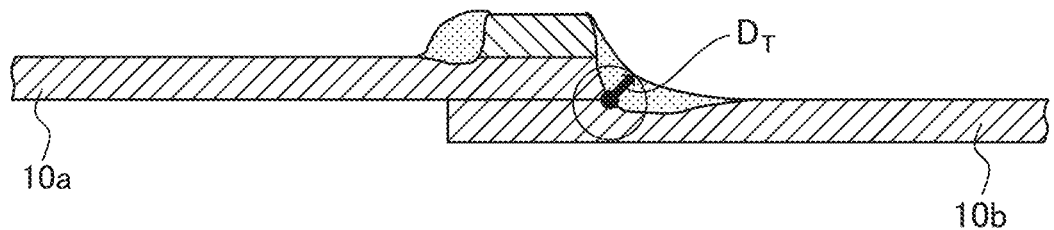
Figure 15:
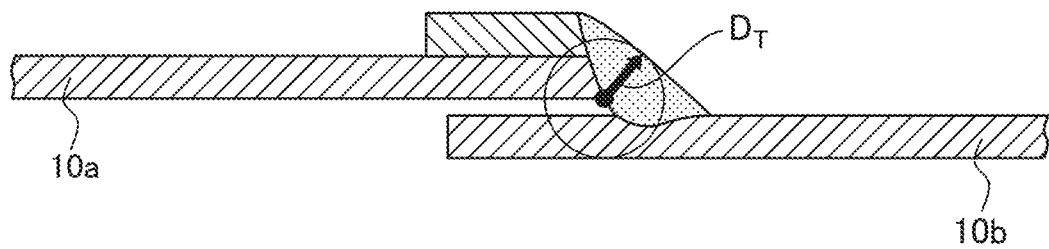

The throat thickness $D_T$, as shown in FIGS. 15A and 15B, is defined as the shortest distance from the root part to the fillet welding surface. FIG. 15A shows an example in the case where the weld bead of the fillet weld zone is formed convex, while FIG. 15B shows an example of the case where the weld bead is formed concave.

As shown in FIG. 15C, when there is a gap between the upper sheet and the lower sheet, the shorter of the shortest distance from the root part at the upper sheet side to the fillet welding surface and the shortest distance from the root part at the lower sheet side to the fillet welding surface is made the throat thickness.

According to studies of the inventors, it was learned that when the throat thickness of the fillet weld zone is $D_T$ (mm), the average hardness of the fillet weld zone is $H_F$ (HV), the thickness of the upper side steel sheet is $D_1$ (mm), the smaller hardness of the hardness of the HAZ softened part of the fillet weld zone of the upper side steel sheet and the hardness of the base material of the upper side steel sheet is $H_S$ (HV), if $(D_T \times H_F)/(D_1 \times H_S)$ is 1.20 or more, preferably 1.50, the tensile strength can be improved more. The hardness here is the Vickers hardness.

Further, when the melted width of the lower side steel sheet is $L_b$ (mm), satisfying $(L_b \times H_F)/(D_1 \times _S) \geq 1.70$ is more preferable for improvement of the tensile strength.

Figure 2:
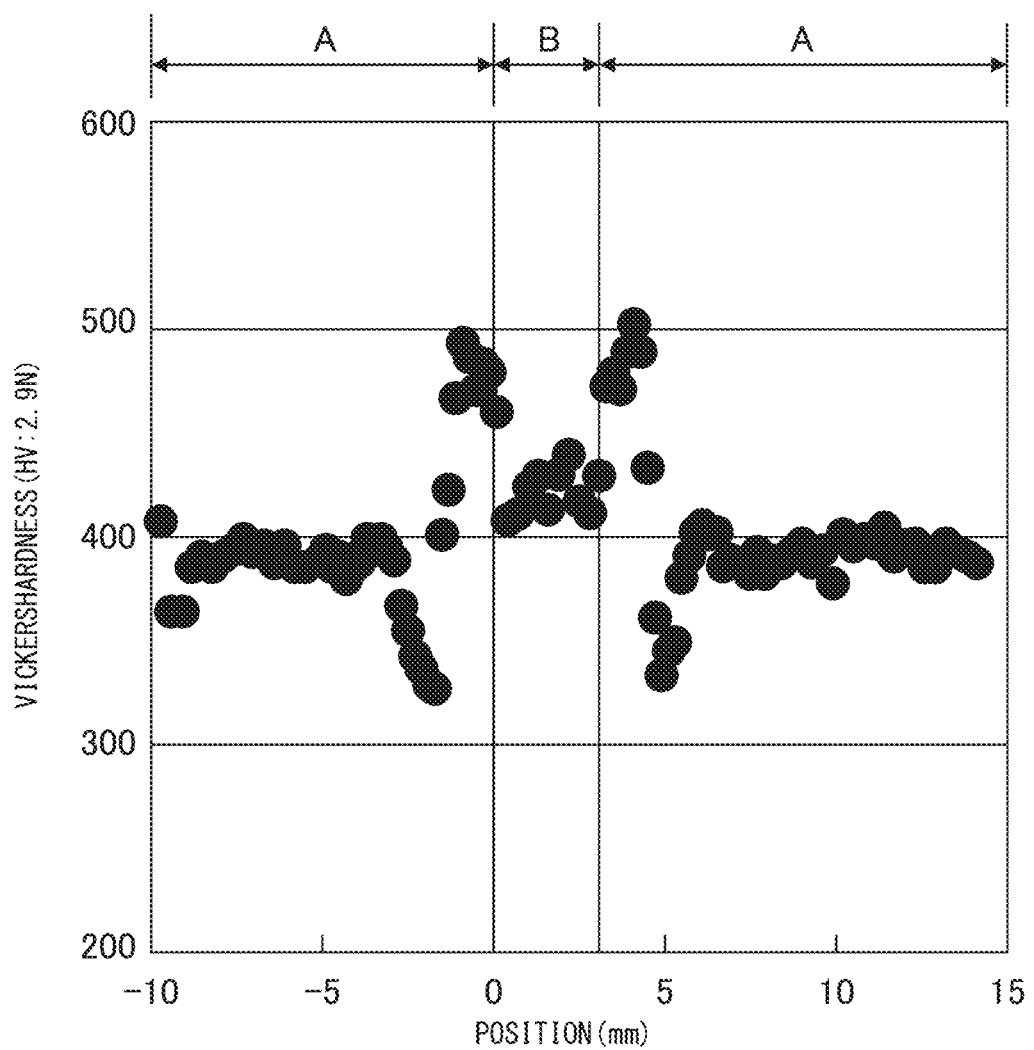
FIG. 2 A view showing a distribution of Vickers hardness.

The average hardness of the fillet weld zone is made the average value of the Vickers hardnesses of the weld metal in the region shown by B in FIG. 2. If inside the weld metal, the measurement positions and the number of measurements may be freely determined.

To more effectively improve the tensile strength of the welded joint, it is possible to suitably adjust the welding conditions so as to satisfy the above relationship.

EXAMPLES

Example 1

Next, examples of the present invention will be explained, but the conditions in the examples are just one illustration of the conditions employed for confirming the workability and advantageous effect of the present invention. The present invention is not limited to this one illustration of conditions. The present invention can employ various conditions so long as not departing from the gist of the present invention and achieving the object of the present invention.

Steel sheets of lengths of 100 mm and widths of 25 mm shown in Table 1 were prepared. Further, rectangular parallelepiped shaped reinforcing materials such as shown in FIG. 3A and FIG. 4 were fabricated by working tensile strength 1180 MPa steel sheets. Table 2 shows the dimensions of the reinforcing materials. In FIG. 3A, the right side end of the reinforcing material is aligned with the right side end of the upper side steel sheet 10a.

The combinations of steel sheets shown in Table 3 were overlaid at the ends of the steel sheets in the longitudinal directions by overlaps X of 20 mm, reinforcing materials were overlaid, with some exceptions, and the assemblies were fillet welded using the welding wires shown in Table 3 to prepare test pieces. Table 3 shows the heights and lengths of the fillet weld zones. Formula 1 in Table 3 shows the values of $(D_T \times H_F)/(D_1 \times H_S)$ where the throat thickness of the weld zone is $D_T$ (mm), the average hardness of the weld zone is $H_F$ (HV), the thickness of the upper side steel sheet is $D_1$ (mm), and the smaller hardness of the hardness of the HAZ softened part of the weld zone of the upper side steel sheet and the hardness of the base material of the upper side steel sheet is $H_S$ (HV) (below, same in Example 2, Example 3, and Comparative Example).

Further, Table 4 shows the welding conditions of the fillet welding.

TABLE 3

| Test No. | Steel sheet no. Upper side | Steel sheet no. Lower side | Reinforcing material no. | Welding wire | Weld zone height td (mm) | Weld zone height tc (mm) | Weld zone total length Lb (mm) |
|---|---|---|---|---|---|---|---|
| 1 | S1 | S1 | R1 | 780 MPa class use | 1.6 | 3.5 | 25 |
| 2 | S1 | S1 | R1 | 780 MPa class use | 1.6 | 3.2 | 25 |
| 3 | S3 | S3 | R1 | 780 MPa class use | 1.7 | 3.2 | 25 |
| 4 | S1 | S1 | R3 | 780 MPa class use | 1.6 | 3.5 | 25 |
| 5 | S1 | S1 | R2 | 780 MPa class use | 1.6 | 3.2 | 25 |
| 6 | S2 | S2 | None | 780 MPa class use | — | 1.8 | 25 |
| 7 | S3 | S3 | R1 | 780 MPa class use | 1.6 | 2.2 | 25 |
| 8 | S1 | S1 | R1 | 590 MPa class use | 1.6 | 3.2 | 25 |
| 9 | S1 | S1 | R1 | 440 MPa class use | 1.5 | 3.5 | 25 |
| 10 | S1 | S1 | None | 780 MPa class use | — | 1.5 | 25 |
| 11 | S1 | S1 | R1 | 780 MPa class use | — | 2.2 | 25 |

| Test No. | Weld zone length of right side of reinforcing material Lc (mm) | Weld zone length of left side of reinforcing material Ld (mm) | Throat thickness of weld zone $D_T$ (mm) | Average hardness of weld zone (HV) | HAZ softening or base material hardness (HV) | Formula 1 |
|---|---|---|---|---|---|---|
| 1 | 25 | 25 | 3.5 | 421 | 318 | 2.90 |
| 2 | 25 | 25 | 3.2 | 420 | 321 | 2.62 |
| 3 | 25 | 25 | 3.2 | 379 | 251 | 3.02 |
| 4 | 15 | 15 | 3.5 | 422 | 323 | 2.86 |
| 5 | 25 | 25 | 3.2 | 421 | 318 | 2.65 |
| 6 | — | — | 1.8 | 353 | 201 | 1.98 |
| 7 | 25 | 25 | 1.8 | 383 | 251 | 1.72 |
| 8 | 25 | 25 | 3.2 | 401 | 323 | 2.48 |
| 9 | 25 | 25 | 3.5 | 297 | 321 | 2.02 |
| 10 | — | — | 1.3 | 412 | 322 | 1.04 |
| 11 | 25 | — | 1.4 | 426 | 324 | 1.15 |

TABLE 1

| Steel sheet no. | Thickness (mm) | Tensile strength (MPa) |
|---|---|---|
| S1 | 1.6 | 1180 |
| S2 | 1.6 | 590 |
| S3 | 1.6 | 780 |

TABLE 2

| Reinforcing material no. | Thickness ta (mm) | Tensile strength (MPa) | Width W (mm) | Length La (mm) |
|---|---|---|---|---|
| R1 | 1.6 | 1180 | 20 | 25 |
| R2 | 1.6 | 1180 | 10 | 25 |
| R3 | 1.6 | 1180 | 20 | 15 |

TABLE 4

| | |
|---|---|
| Welding system | Consumable type electrode welding |
| Shield gas | 100% $CO_2$ |
| Shield gas flow rate | 15 L/min |
| Welding speed | 60 cm/min |
| Welding current | 115 A |
| Welding voltage | 24.5 V |

Further, the two end parts of the prepared test pieces were gripped and tensile tests were performed. The tensile tests were performed by a tensile speed of 10 mm/min. Table 5 shows the tensile strengths and fracture locations.

TABLE 5

| Test no. | Tensile strength (kN) | Fracture location | Class |
|---|---|---|---|
| 1 | 47 | Heat affected zone | Invention example |
| 2 | 47 | Heat affected zone | Invention example |
| 3 | 31 | Heat affected zone | Invention example |
| 4 | 32 | Heat affected zone | Invention example |
| 5 | 46 | Heat affected zone | Invention example |
| 6 | 24 | Base material | Comparative example |
| 7 | 31 | Heat affected zone | Invention example |
| 8 | 40 | Heat affected zone | Invention example |
| 9 | 34 | Heat affected zone | Invention example |

TABLE 5-continued

| Test no. | Tensile strength (kN) | Fracture location | Class |
|---|---|---|---|
| 10 | 18 | Weld metal | Comparative example |
| 11 | 19 | Weld metal | Comparative example |

Test Nos. 1 to 5 and 7 to 9 used reinforcing materials and then performed fillet welding, so the tensile strengths were high and the fracture locations became the heat affected zones.

Test No. 6 performed fillet welding without using a reinforcing material, but the base material strength was low, so the fracture location was the base materials.

Test No. 10 performed fillet welding without using a reinforcing material, so the tensile strength was low and the fracture location became the weld metal.

Test No. 11 performed the fillet welding in a state with no reinforcing material bonded to the upper side steel sheet, so the effect of a reinforcing material was not obtained, the tensile strength was low, and the fracture location became the weld metal.

Example 2

Steel sheets shown in Table 6 of lengths of 100 mm and widths of 25 mm were prepared. Further, rectangular parallelepiped shaped reinforcing materials such as shown in FIG. 3A and FIG. 4 were prepared by working tensile strength 1180 MPa steel sheets. Table 7 shows the dimensions of the reinforcing materials. In FIG. 3A, the right side end of the reinforcing material is aligned with the right side end of the upper side steel sheet 10a.

TABLE 6

| Steel sheet no. | Thickness (mm) | Tensile strength (MPa) |
|---|---|---|
| S21 | 1.6 | 1180 |
| S22 | 1.6 | 780 |

TABLE 7

| Reinforcing material no. | Thickness ta (mm) | Tensile strength (MPa) | Width W (mm) | Length La (mm) |
|---|---|---|---|---|
| R21 | 1.6 | 1180 | 20 | 25 |
| R22 | 1.6 | 1180 | 10 | 25 |
| R23 | 1.6 | 1180 | 20 | 15 |

The combinations of reinforcing materials and upper side steel sheets shown in Table 8 were overlaid, with some exceptions, and joined by spot welding at single locations at the approximate centers of the reinforcing materials. This was performed to give nugget sizes (lengths and widths of joined parts) of 6 mm.

After that, to give the combinations shown in Table 8, the lower side steel sheets were overlaid on the assemblies of the upper side steel sheets and reinforcing materials and fillet welded to prepare test pieces. At that time, the ends of the upper side steel sheets and the lower side steel sheets in the longitudinal direction were overlaid by overlays X of 20 mm. Table 8 shows the heights and lengths of the fillet weld zones, the lengths of the weld zones at the right sides of the reinforcing materials, the unmelted widths of the reinforcing materials, and the lengths and widths of the joined parts. Further, Table 9 shows the welding conditions of the fillet welding.

TABLE 8

| Test no. | Steel sheet no. Upper side | Steel sheet no. Lower side | Reinforcing material no. | Weld zone height tc (mm) | Weld zone total length Lb (mm) | Weld zone length at right side of reinforcing material Lc (mm) | Unmelted width of reinforcing material Wb (mm) |
|---|---|---|---|---|---|---|---|
| 21 | S21 | S21 | R21 | 3.5 | 25 | 25 | 16 |
| 22 | S21 | S21 | R21 | 3.2 | 25 | 25 | 17 |
| 23 | S22 | S22 | R21 | 3.2 | 25 | 25 | 15 |
| 24 | S21 | S21 | R23 | 3.5 | 25 | 15 | 15 |
| 25 | S21 | S21 | R22 | 3.2 | 25 | 25 | 7 |

| Test no. | Joined part length Ld (mm) | Joined part width Wa (mm) | Weld zone throat thickness $D_T$ (mm) | Weld zone average hardness (HV) | HAZ softening or base material hardness (HV) | Formula 1 |
|---|---|---|---|---|---|---|
| 21 | 6 | 6 | 3.2 | 420 | 321 | 2.62 |
| 22 | 6 | 6 | 2.6 | 427 | 319 | 2.18 |
| 23 | 6 | 6 | 3.0 | 389 | 261 | 2.79 |
| 24 | 6 | 6 | 3.1 | 418 | 316 | 2.56 |
| 25 | 6 | 6 | 2.4 | 410 | 317 | 1.94 |

TABLE 9

| | |
|---|---|
| Welding system | Consumable type electrode welding |
| Welding wire | 780 MPa class use(YM80C) ϕ0.9 mm |
| Shield gas | 100% $CO_2$ |
| Shield gas flow rate | 15 L/min |
| Welding speed | 60 cm/min |
| Welding current | 115 A |
| Welding voltage | 24.5 V |

Further, the two end parts of the prepared test pieces were gripped and tensile tests were performed. The tensile tests were performed by a tensile speed of 10 mm/min. Table 10 shows the tensile strengths and fracture locations.

dinal direction were overlaid with overlays X of 20 mm. Table 13 shows the heights and lengths of the fillet weld zones. Further, Table 14 shows the welding conditions of the reinforcing beads and fillet welding.

TABLE 13

| Test no. | Steel sheet No. Upper side | Steel sheet No. Lower side | Reinforcing bead no. | Weld zone height tc (mm) | Weld zone total length Lb (mm) | Weld zone length at right side of reinforcing bead Lc (mm) | Weld zone throat thickness $D_T$ (mm) | Average hardness of weld zone (HV) | HAZ softening or base material hardness (HV) | Formula 1 |
|---|---|---|---|---|---|---|---|---|---|---|
| 31 | S31 | S31 | R31 | 3.5 | 25 | 25 | 3.2 | 414 | 319 | 47 |
| 32 | S31 | S31 | R31 | 3.2 | 25 | 25 | 2.6 | 420 | 320 | 44 |
| 33 | S32 | S32 | R31 | 3.2 | 25 | 25 | 2.7 | 380 | 255 | 32 |
| 34 | S31 | S31 | R33 | 3.5 | 25 | 15 | 3.0 | 417 | 330 | 22 |
| 35 | S31 | S31 | R32 | 3.2 | 25 | 25 | 2.7 | 425 | 324 | 42 |

TABLE 10

| Test No. | Tensile strength (kN) | Fracture location | Class |
|---|---|---|---|
| 21 | 47 | Heat affected zone | Invention example |
| 22 | 46 | Heat affected zone | Invention example |
| 23 | 30 | Heat affected zone | Invention example |
| 24 | 30 | Heat affected zone | Invention example |
| 25 | 42 | Heat affected zone | Invention example |

TABLE 14

| | |
|---|---|
| Welding system | Consumable type electrode welding |
| Welding wire | 780 MPa class use(YM80C) ϕ0.9 mm |
| Shield gas | 100% $CO_2$ |
| Shield gas flow rate | 15 L/min |
| Welding speed | 60 cm/min |
| Welding current | 115 A |
| Welding voltage | 24.5 V |

The reinforcing material was used for fillet welding. As a result, in the same way as Example 1, the tensile strength was high and the fracture location became the heat affected zone.

Further, the two end parts of the prepared test pieces were gripped and tensile tests were performed. The tensile tests were performed by a tensile speed of 10 mm/min. Table 15 shows the tensile strengths and fracture locations.

Example 3

Steel sheets of lengths of 100 mm and widths of 25 mm shown in Table 11 were prepared.

TABLE 15

| Test no. | Tensile strength (kN) | Fracture location | Class |
|---|---|---|---|
| 31 | 47 | Heat affected zone | Invention example |
| 32 | 44 | Heat affected zone | Invention example |
| 33 | 32 | Heat affected zone | Invention example |
| 34 | 30 | Heat affected zone | Invention example |
| 35 | 42 | Heat affected zone | Invention example |

TABLE 11

| Steel sheet no. | Thickness (mm) | Tensile strength (MPa) |
|---|---|---|
| S31 | 1.6 | 1180 |
| S32 | 1.6 | 780 |

Reinforcing beads of the shapes such as shown in FIG. 11A and FIG. 12 were formed at the upper side surfaces of the upper side steel sheets. Further, the toe parts 40 of the reinforcing beads, as shown in FIG. 11A, are aligned with the end parts of the upper side steel sheet 10a. Table 12 shows the heights, widths, and lengths of the reinforcing beads.

The reinforcing beads were formed and fillet welding performed. As a result, in the same way as Example 1 and Example 2, the tensile strengths were high and the fracture locations became the heat affected zones.

Comparative Example

Steel sheets of lengths of 100 mm and widths of 25 mm shown in Table 16 were prepared.

TABLE 12

| Reinforcing bead no. | Height ta' (mm) | Width W' (mm) | Length La (mm) |
|---|---|---|---|
| R31 | 1.6 | 14 | 25 |
| R32 | 1.6 | 7 | 25 |
| R33 | 1.6 | 14 | 15 |

TABLE 16

| Steel sheet no. | Thickness (mm) | Tensile strength (MPa) |
|---|---|---|
| S41 | 1.6 | 1180 |
| S42 | 1.6 | 780 |

Figure 16:
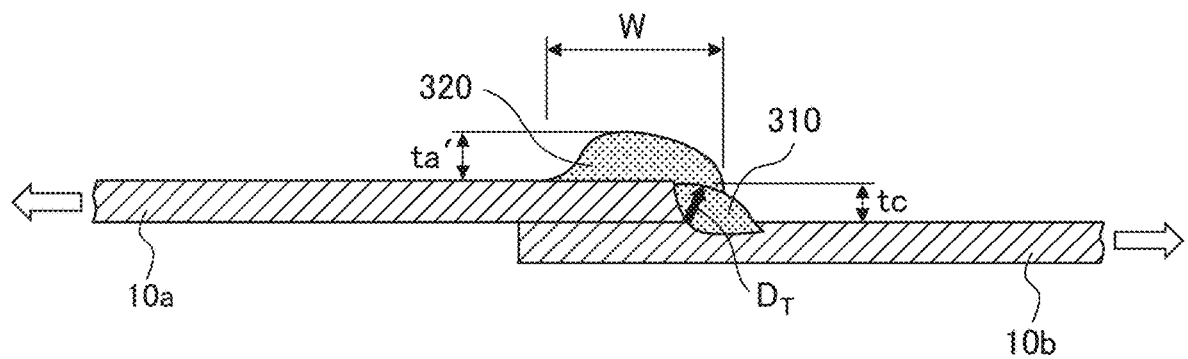

After that, to obtain the combinations shown in Table 13, lower side steel sheets were overlaid on the upper side steel sheets formed with the reinforcing beads and fillet welded to prepare test pieces. At this time, the end parts of the upper side steel sheets and lower side steel sheets in the longitu- As shown in FIG. 16, the upper side steel sheets and lower side steel sheets were fillet welded to form the main weld zones and, further, reinforcing beads were formed on the weld beads formed by the fillet welding as multilayer buildup welding to prepare test pieces. The overlaps X of the ends of the upper side steel sheets and the lower side steel sheets in the longitudinal direction were made 20 mm. Table 17 shows the heights and lengths of the weld zones. Further, Table 18 shows the welding conditions of the reinforcing beads and the fillet weldings.

TABLE 17

| Test no. | Steel sheet no. Upper side | Steel sheet no. Lower side | Main weld zone height tc (mm) | Main weld zone total length Lb (mm) | Reinforcing bead height ta' (mm) | Reinforcing bead width W (mm) | Reinforcing bead total length Lc (mm) | Weld zone throat thickness $D_T$ (mm) | Weld zone average hardness (HV) | HAZ softening or base material hardness (HV) | Formula 1 |
|---|---|---|---|---|---|---|---|---|---|---|---|
| 41 | S41 | S41 | 1.8 | 25 | 1.4 | 6 | 25 | 1.7 | 325 | 304 | 1.14 |
| 42 | S41 | S41 | 1.6 | 25 | 1.5 | 12 | 25 | 1.6 | 320 | 310 | 1.03 |
| 43 | S42 | S42 | 1.9 | 25 | 1.6 | 7 | 25 | 1.6 | 301 | 252 | 1.19 |
| 44 | S41 | S41 | 1.7 | 25 | 1.7 | 8 | 15 | 1.6 | 327 | 301 | 1.09 |

TABLE 18

| | |
|---|---|
| Welding system | Consumable type electrode welding |
| Welding wire | 780 MPa class use(YM80C) φ0.9 mm |
| Shield gas | 100% $CO_2$ |
| Shield gas flow rate | 15 L/min |
| Welding speed | 60 cm/min |
| Welding current | 115 A |
| Welding voltage | 24.5 V |

Further, the two end parts of the prepared test pieces were gripped and tensile tests were performed. The tensile tests were performed by a tensile speed of 10 mm/min. Table 19 shows the tensile strengths and fracture locations.

TABLE 19

| Test no. | Tensile strength (kN) | Fracture location | Class |
|---|---|---|---|
| 41 | 20 | Weld metal | Comparative example |
| 42 | 18 | Weld metal | Comparative example |
| 43 | 23 | Weld metal | Comparative example |
| 44 | 15 | Weld metal | Comparative example |

As a result of fillet welding by multilayer buildup, the effect of improvement of tensile strength cannot be obtained and the fracture location becomes the weld metal. This is believed to be because, due to multilayer buildup, as shown in FIG. 16, the throat thickness $D_T$ does not become larger and, further, the main weld zone is partially tempered when forming the reinforcing bead, so a softened region is formed in the main weld zone.

INDUSTRIAL APPLICABILITY

According to the present invention, a reinforcing part is provided on the surface of a high strength steel sheet and then fillet welding is performed, so concentration of stress at the root part can be avoided and the tensile strength can be improved without increasing the welding deformation of the welded joint. Accordingly, the present invention is high in industrial applicability.

REFERENCE SIGNS LIST 1a, 1b. steel sheets (base materials)
2. weld bead (fillet weld zone)
10a. upper side steel sheet
10b. lower side steel sheet
20. weld bead (fillet weld zone)
30. reinforcing material
40. weld bead (fillet weld zone)
120. weld bead (fillet weld zone)
130. reinforcing material
140. weld bead (fillet weld zone)
220. fillet weld bead (fillet weld zone)
230. reinforcing bead
240. toe end of reinforcing bead
250. toe end of fillet weld bead
310. main weld zone (fillet weld zone)
320. reinforcing bead
ta, thickness of reinforcing part
ta'. maximum height of reinforcing bead
tb. thickness of upper side steel sheet
tc. height of fillet weld zone
td. height of fillet weld zone
La. length of reinforcing part
Lb, Lb1, Lb2. total length of fillet weld zone
Lc, Lc1, Lc2. length of fillet weld zone of reinforcing part
Ld, Ld1, Ld2. length of weld zone
W. width of reinforcing part
W'. maximum width of reinforcing bead
Wa, Wa1, Wa2. widths of joined parts
Wb. unmelted width of reinforcing part
X. maximum overlap
$D_T$. throat thickness

The invention claimed is:

1. A method of fillet welding comprising overlaying scheduled welding locations of a first steel sheet and a second steel sheet, the first steel sheet having a tensile strength of 780 MPa or more,
   the method comprising the steps of:
   arranging a reinforcing part joined to a surface of the first steel sheet at the opposite side to a surface which is in contact with the second steel sheet when overlaying the first steel sheet and the second steel sheet; and
   forming a fillet weld zone by fillet welding so that a weld metal of the fillet weld zone covers an end part of the reinforcing part, an end part of the first steel sheet, and the surface of the second steel sheet.

2. The method according to claim 1, wherein $(D_T \times H_F)/(D_1 \times H_S)$ is 1.50 or more wherein $D_T$ (mm) is a throat thickness of the fillet weld zone, $H_F$ (HV) is an average hardness of the fillet weld zone, $D_1$ (mm) is a thickness of the first steel sheet, and Hs (HV) is a smaller hardness of a hardness of a HAZ softened part of the fillet weld zone of the first steel sheet and a hardness of a base material of the first steel sheet.

3. The method according to claim 2, wherein the reinforcing part is a reinforcing material.

4. The method according to claim 2, wherein the reinforcing part is a weld bead formed at the surface of the first steel sheet at the opposite side to the surface overlaid with the second steel sheet.

5. The method according to claim 2, wherein the reinforcing part is formed by working the first steel sheet.

6. The method according to claim 1, wherein the reinforcing part is a reinforcing material.

7. The method according to claim 6, wherein the end part of the reinforcing material is fillet welded to the surface of the first steel sheet at the opposite side to the surface of the first steel sheet contacting the second steel sheet when overlaying the first steel sheet and the second steel sheet.

8. The method according to claim 6, wherein the reinforcing material is joined to the surface of the first steel sheet at the opposite side to the surface of the first steel sheet contacting the second steel sheet when overlaying the first steel sheet and the second steel sheet at the overlaid surfaces at the reinforcing material and first steel sheet.

9. The method according to claim 1, wherein the reinforcing part is a weld bead formed at the surface of the first steel sheet at the opposite side to the surface overlaid with the second steel sheet.

10. The method according to claim 1, wherein the reinforcing part is formed by working the first steel sheet.

11. A fillet welded joint comprising a first steel sheet and a second steel sheet fillet welded together, the first steel sheet having tensile strength of 780 MPa or more, the fillet welded joint comprising a reinforcing part joined to a surface of the first steel sheet at an opposite side to a surface of the first steel sheet contacting the second steel sheet when overlaying the first steel sheet and the second steel sheet; and a fillet weld zone which covers an end part of the first steel sheet, a surface of the second steel sheet, and an end part of the reinforcing part.

12. The fillet welded joint of according to claim 11, wherein $(D_T \times H_F)/(D_1 \times H_S)$ is 1.50 or more wherein $D_T$ (mm) is a throat thickness of the fillet weld zone, $H_F$ (HV) is an average hardness of the fillet weld zone, $D_1$ (mm) is a thickness of the first steel sheet, and $H_S$ (HV) is a smaller hardness of a hardness of a HAZ softened part of the fillet weld zone of the first steel sheet and a hardness of a base material of the first steel sheet.

13. The fillet welded joint of said claim 12, wherein the reinforcing part is a reinforcing material.

14. The fillet welded joint of claim 12, wherein the reinforcing part is a weld bead formed on the surface of the first steel sheet at the opposite side to the surface which is overlaid on the second steel sheet.

15. The fillet welded joint of claim 12, wherein the reinforcing part is formed by working the first steel sheet.

16. The fillet welded joint of said claim 11, wherein the reinforcing part is a reinforcing material.

17. The fillet welded joint of claim 16, wherein the end part of the reinforcing material is fillet welded to the surface of the first steel sheet at the opposite side to the surface of the first steel sheet contacting the second steel sheet when overlaying the first steel sheet and the second steel sheet.

18. The fillet welded joint of claim 16, wherein the reinforcing material is joined to the surface of the first steel sheet at the opposite side to the surface of the first steel sheet contacting the second steel sheet when overlaying the first steel sheet and second steel sheet at the overlaid surfaces of the reinforcing material and first steel sheet.

19. The fillet welded joint of claim 11, wherein the reinforcing part is a weld bead formed on the surface of the first steel sheet at the opposite side to the surface which is overlaid on the second steel sheet.

20. The fillet welded joint of claim 11, wherein the reinforcing part is formed by working the first steel sheet.

* * * * *